US012795747B2

(12) United States Patent
Zhao

(10) Patent No.: US 12,795,747 B2
(45) Date of Patent: Nov. 10, 2026

(54) RANDOM ACCESS METHOD AND DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 481 days.

(21) Appl. No.: 18/013,549

(22) PCT Filed: Jun. 4, 2021

(86) PCT No.: PCT/CN2021/098428
§ 371 (c)(1),
(2) Date: Dec. 29, 2022

(87) PCT Pub. No.: WO2022/001583
PCT Pub. Date: Jan. 6, 2022

(65) Prior Publication Data

US 2023/0292377 A1 Sep. 14, 2023

(30) Foreign Application Priority Data

Jun. 30, 2020 (CN) ......................... 202010623897.9

(51) Int. Cl.
*H04W 74/0833* (2024.01)
*H04W 74/0836* (2024.01)
*H04W 74/0838* (2024.01)

(52) U.S. Cl.
CPC ... *H04W 74/0841* (2013.01); *H04W 74/0833* (2013.01); *H04W 74/0836* (2024.01); *H04W 74/0838* (2024.01)

(58) Field of Classification Search
CPC ......... H04W 74/0841; H04W 74/0833; H04W 48/20; H04W 74/0836; H04W 74/0838;
(Continued)

(56) References Cited

U.S. PATENT DOCUMENTS 7,024,190 B1 4/2006 Raust et al.
10,348,394 B1 7/2019 Bakr et al.
(Continued)

FOREIGN PATENT DOCUMENTS

CN 103546980 A 1/2014
CN 103945471 A 7/2014
(Continued)

OTHER PUBLICATIONS

Ericsson, "On random access procedures for NTN", 3GPP TSG RAN WG2 #106, Reno, Nevada, US, May 13-May 17, 2019, total 5 pages, R2-1907296.
(Continued)

*Primary Examiner* — Jae Y Lee
*Assistant Examiner* — Haeshil Jessica Choi
(74) *Attorney, Agent, or Firm* — KILPATRICK TOWNSEND & STOCKTON LLP

(57) ABSTRACT

Disclosed are a random access method and device, including in a random access process, a base station to which a satellite cell belongs sending a random access related message by means of a terrestrial cell that a UE accesses and indicating the cell type corresponding to the random access related message, and the UE receiving the random access related message sent by the terrestrial cell; and determining the cell type corresponding to the random access related message, the cell type being the terrestrial cell or the satellite cell. The present disclosure provides a method for random access by the satellite cell with the assistance of the terrestrial cell. According to the method, the random access delay of a
(Continued)

satellite communication system can be reduced, and the delay overhead is reduced.

15 Claims, 7 Drawing Sheets

(58) Field of Classification Search
CPC . H04W 76/11; H04W 56/0045; H04W 84/06; H04W 74/002; H04B 7/1853; H04B 7/1851; H04B 7/18513; H04B 7/18519
USPC .......................................................... 370/329
See application file for complete search history.

(56) References Cited

U.S. PATENT DOCUMENTS

| | | | | |
|---|---|---|---|---|
| 11,910,468 | B2 * | 2/2024 | Hong | H04W 74/0833 |
| 2018/0020486 | A1 * | 1/2018 | Yano | H04W 72/52 |
| 2020/0107235 | A1 * | 4/2020 | Peisa | H04W 74/02 |
| 2021/0410181 | A1 * | 12/2021 | Jeon | H04W 52/0258 |
| 2022/0053321 | A1 * | 2/2022 | Gao | H04W 8/26 |
| 2022/0225195 | A1 * | 7/2022 | Park | H04W 24/08 |
| 2022/0248458 | A1 * | 8/2022 | Chen | H04W 74/04 |
| 2023/0056778 | A1 * | 2/2023 | Lin | H04B 7/18508 |

FOREIGN PATENT DOCUMENTS

| | | | |
|---|---|---|---|
| CN | 104936206 | A | 9/2015 |
| CN | 107509203 | A | 12/2017 |
| CN | 108282902 | A | 7/2018 |
| CN | 110099388 | A | 8/2019 |
| CN | 110572856 | A | 12/2019 |
| CN | 110972217 | A | 4/2020 |
| CN | 111095820 | A | 5/2020 |
| JP | 2014161076 | A | 9/2014 |
| KR | 20200040193 | A | 4/2020 |
| WO | 2014107964 | A1 | 7/2014 |
| WO | 2018128455 | A1 | 7/2018 |
| WO | 2019097922 | A1 | 5/2019 |
| WO | 2020071698 | A1 | 4/2020 |
| WO | 2020084878 | A1 | 4/2020 |

OTHER PUBLICATIONS

The Hearing Notice received in the counterpart India Application 202327002283, mailed on Feb. 7, 2025.
Office Action of Corresponding KR Patent Application No. 10-2023-7003029 Dated Aug. 4, 2025.
Korean Written Decision on Registration for Korean Application No. 10-2023-7003029 dated Jun. 10, 2026.

* cited by examiner

RANDOM ACCESS METHOD AND DEVICE

CROSS REFERENCE TO RELATED APPLICATIONS

The present application is a National Stage of International Application No. PCT/CN2021/098428, filed on Jun. 4, 2021, which claims the priority to Chinese Patent Application No. 202010623897.9, filed to China National Intellectual Property Administration on Jun. 30, 2020 and entitled “RANDOM ACCESS METHOD AND DEVICE”, both of which are incorporated in their entirety herein by reference.

FIELD

The present disclosure relates to the field of communication technology, and in particular to a random access method and device.

BACKGROUND

In the future, the mobile communication system possibly employs the space-ground integrated networking mode, that is, a complete network is composed of the satellite communication system and the terrestrial communication system. Compared with the terrestrial communication system, the satellite communication system typically features extremely long transmission delay.

The 5G random access process is divided into two types of four-step random access involving Msg1 and two-step random access involving MsgA. Both types of random access support contention-based random access (CBRA) and contention-free random access (CFRA).

In the CBRA method, different user equipments (UE) may use the same random access resource, possibly leading to collision. In the CFRA method, the network allocates the specific random access resource to the UE, and can identify the UE according to the specific random access resource used by the UE. The UE selects the random access type based on the network configuration when initiating random access.

If no CFRA resource is configured, the UE selects between two-step random access and four-step random access of the CBRA method based on the threshold of the reference signal receiving power (RSRP).

If the CFRA resource is configured for four-step random access, the UE selects four-step random access.

If the CFRA resource is configured for two-step random access, the UE selects two-step random access.

Currently, the random access process of the satellite communication system is divided into two types of four-step random access involving Msg1 and two-step random access involving MsgA. However, the satellite communication is far away from the ground, resulting in extremely long random access delay when the UE performs random access through the satellite cell. Therefore, reduction in random access delay of the satellite cell is required during space-ground integrated networking.

SUMMARY

The present disclosure provides a random access method and device, to solve a large time delay of random access of a satellite communication system.

In one embodiment of the present disclosure provides a random access method, performed by a user equipment (UE) and including: receiving a random access related message transmitted by a terrestrial cell; and determining a cell type corresponding to the random access related message, and the cell type is the terrestrial cell or a satellite cell.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the determining the cell type corresponding to the random access related message includes: determining the cell type corresponding to the random access related message through indication information added to the random access related message; or determining the cell type corresponding to the random access related message through a radio network temporary identity (RNTI) scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the method further includes: receiving a first contention resolution timer used for contention resolution of contention-based random access of the satellite cell and a second contention resolution timer used for contention resolution of contention-based random access of the terrestrial cell, which are both configured by a network apparatus, and a time length of the first contention resolution timer is the same as or different from a time length of the second contention resolution timer, and/or a starting time of the first contention resolution timer is different from a starting time of the second contention resolution timer.

In one embodiment, the method further includes: transmitting a third message (Msg3) of four-step contention-based random access to the satellite cell, and the Msg3 carries a cell-radio network temporary identity (C-RNTI) used by the UE in the satellite cell.

In one embodiment, the method further includes: determining that the contention resolution succeeds if the random access related message includes at least one of the following: an uplink and/or downlink resource allocated to the UE by a base station to which the satellite cell belongs and used by the UE in the satellite cell; or a C-RNTI used by the UE in the satellite cell.

In one embodiment of the present disclosure provides a random access method performed by a base station to which a satellite cell belongs. The method includes: determining a terrestrial cell accessed by a UE; and transmitting a random access related message to the UE through the terrestrial cell, and indicating that cell type corresponding to the random access related message is the satellite cell.

In one embodiment, in a condition that the terrestrial cell and the satellite cell belong to different base stations, the transmitting the random access related message to the UE through the terrestrial cell, and indicating that the cell type corresponding to the random access related message is the satellite cell includes: exchanging part or all of a content of the random access related message with the terrestrial cell through an inter-base-station interface.

In one embodiment, the exchanging part or all of the content of the random access related message with the terrestrial cell through the inter-base-station interface includes: generating a complete random access related message, and transmitting the generated random access related message to the terrestrial cell through the inter-base-station interface; or transmitting all or part of the content of the random access related message to the terrestrial cell, and a base station to which the terrestrial cell belongs generates a complete random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the indicating that the cell type corresponding to the random access related message is the satellite cell includes: indicating that the cell type corresponding to the random access related message is the satellite cell through indication information added to the random access related message; or indicating that the cell type corresponding to the random access related message is the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the method further includes: configuring, for the UE, a first contention resolution timer for contention resolution of contention-based random access of the satellite cell, and a time length of the first contention resolution timer is the same as or different from a time length of a second contention resolution timer for contention resolution of contention-based random access of the terrestrial cell; and/or configuring, for the UE, a starting time of a first contention resolution timer for contention resolution of contention-based random access of the satellite cell, and the starting time of the first contention resolution timer is different from a starting time of a second contention resolution timer for contention resolution of contention-based random access of the terrestrial cell.

In one embodiment, the method further includes: receiving a third message (Msg3) of the four-step contention-based random access transmitted by the UE, and the Msg3 carries a C-RNTI used by the UE in the satellite cell.

In one embodiment of the present disclosure provides a random access method performed by a base station to which a terrestrial cell belongs. The method includes: receiving a random access related message transmitted by a satellite cell and for a user equipment (UE); and transmitting the random access related message to the UE, and indicating that a cell type corresponding to the random access related message is the satellite cell.

In one embodiment, in a condition that the terrestrial cell and the satellite cell belong to different base stations, the receiving the random access related message transmitted by the satellite cell and for the UE includes: exchanging part or all of a content of the random access related message with the satellite cell through an inter-base-station interface.

In one embodiment, the exchanging part or all of the content of the random access related message with the satellite cell through the inter-base-station interface includes: receiving a complete random access related message transmitted by a base station to which the satellite cell belongs through the inter-base-station interface; or receiving part or all of the content of the random access related message transmitted by the satellite cell through the inter-base-station interface, and generating a complete random access related message according to the part or all of the content of the random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the indicating that the cell type corresponding to the random access related message is the satellite cell includes: indicating that the cell type corresponding to the random access related message is the satellite cell through indication information added to the random access related message; or indicating that the cell type corresponding to the random access related message is the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the method further includes: configuring, for the UE, a second contention resolution timer for contention resolution of contention-based random access of the terrestrial cell, and a time length of the second contention resolution timer is different from a time length of a first contention resolution timer for contention resolution of contention-based random access of the satellite cell; and/or configuring, for the UE, a starting time of a second contention resolution timer for contention resolution of contention-based random access of the terrestrial cell, and the starting time of the second contention resolution timer is different from a starting time of a first contention resolution timer for contention resolution of contention-based random access of the satellite cell.

In one embodiment, in a condition that the random access related message includes a fourth message (Msg4) in a four-step contention-based random access process, the Msg4 includes at least one of the following: an uplink and/or downlink resource allocated to the UE by a base station to which the satellite cell belongs and used by the UE in the satellite cell; or a C-RNTI used by the UE in the satellite cell.

In one embodiment of the present disclosure provides a random access device, including a memory and a processor, and: the memory is configured for storing a computer program; and the processor is configured for: reading the computer program from the memory; receiving a random access related message transmitted by a terrestrial cell; and determining a cell type corresponding to the random access related message, and the cell type is the terrestrial cell or a satellite cell.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, determining, by the processor, the cell type corresponding to the random access related message includes: determining the cell type corresponding to the random access related message through indication information added to the random access related message; or determining the cell type corresponding to the random access related message through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the processor is further configured for: receiving a first contention resolution timer used for contention resolution of contention-based random access of the satellite cell and a second contention resolution timer used for contention resolution of contention-based random access of the terrestrial cell, which are both configured by a network apparatus, and a time length of the first contention resolution timer is the same as or different from a time length of the second contention resolution timer, and/or a starting time of the first contention resolution timer is different from a starting time of the second contention resolution timer.

In one embodiment, the processor is further configured for: transmitting a third message (Msg3) of the four-step contention-based random access to the satellite cell, and the Msg3 carries a C-RNTI used by the UE in the satellite cell.

In one embodiment, the processor is further configured for: determining that the contention resolution succeeds when the random access related message includes at least one of the following: an uplink and/or downlink resource allocated to the UE by a base station to which the satellite cell belongs and used by the UE in the satellite cell; or a C-RNTI used by the UE in the satellite cell.

In one embodiment of the present disclosure provides a random access device, applied to a satellite cell and including a memory and a processor, and: the memory is configured for storing a computer program; and the processor is configured for reading the computer program from the memory, determining a terrestrial cell accessed by a UE, and transmitting a random access related message to the UE through the terrestrial cell, and indicating that a cell type corresponding to the random access related message is the satellite cell.

In one embodiment, in a condition that the terrestrial cell and the satellite cell belong to different base stations, the transmitting, by the processor, the random access related message to the UE through the terrestrial cell, and indicating that the cell type corresponding to the random access related message is the satellite cell includes: exchanging part or all of a content of the random access related message with the terrestrial cell through an inter-base-station interface.

In one embodiment, the exchanging, by the processor, part or all of the content of the random access related message with the terrestrial cell through the inter-base-station interface includes: generating a complete random access related message, and transmitting the generated random access related message to the terrestrial cell through the inter-base-station interface; or transmitting all or part of the content of the random access related message to the terrestrial cell, and a base station to which the terrestrial cell belongs generates a complete random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the processor indicating that the cell type corresponding to the random access related message is the satellite cell includes: indicating that the cell type corresponding to the random access related message is the satellite cell through indication information added to the random access related message; or indicating that the cell type corresponding to the random access related message is the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the processor is further configured for: configuring, for the UE, a first contention resolution timer for contention resolution of contention-based random access of the satellite cell, and a time length of the first contention resolution timer is the same as or different from a time length of a second contention resolution timer for contention resolution of contention-based random access of the terrestrial cell; and/or configuring, for the UE, a starting time of a first contention resolution timer for contention resolution of contention-based random access of the satellite cell, and the starting time of the first contention resolution timer is different from a starting time of a second contention resolution timer for contention resolution of contention-based random access of the terrestrial cell.

In one embodiment, the processor is further configured for: receiving a third message (Msg3) of the four-step contention-based random access transmitted by the UE, and the Msg3 carries a C-RNTI used by the UE in the satellite cell.

In one embodiment of the present disclosure provides a random access device, applied to a terrestrial cell and including a memory and a processor, and: the memory is configured for storing a computer program; and the processor is configured for: reading the computer program from the memory; receiving a random access related message transmitted by a satellite cell and for a user equipment (UE); and transmitting the random access related message to the UE, and indicating that a cell type corresponding to the random access related message is the satellite cell.

In one embodiment, in a condition that the terrestrial cell and the satellite cell belong to different base stations, the receiving, by the processor, the random access related message transmitted by the satellite cell and for the UE includes: exchanging part or all of a content of the random access related message with a base station to which the satellite cell belongs through an inter-base-station interface.

In one embodiment, the exchanging, by the processor, part or all of the content of the random access related message with the satellite cell through the inter-base-station interface includes: receiving a complete random access related message transmitted by a base station to which the satellite cell belongs through the inter-base-station interface; or receiving part or all of the content of the random access related message transmitted by the base station to which the satellite cell belongs through the inter-base-station interface, and generating a complete random access related message according to the part or all of the content of the random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, indicating, by the processor, that the cell type corresponding to the random access related message is the satellite cell includes: indicating that the cell type corresponding to the random access related message is the satellite cell through indication information added to the random access related message; or indicating that the cell type corresponding to the random access related message is the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the processor is further configured for: configuring, for the UE, a second contention resolution timer for contention resolution of contention-based random access of the terrestrial cell, and a time length of the second contention resolution timer is different from a time length of a first contention resolution timer for contention resolution of contention-based random access of the satellite cell; and/or configuring, for the UE, a starting time of a second contention resolution timer for contention resolution of contention-based random access of the terrestrial cell, and the starting time of the second contention resolution timer is different from a starting time of a first contention resolution timer for contention resolution of contention-based random access of the satellite cell.

In one embodiment, in a condition that the random access related message includes a message (Msg4) in a four-step contention-based random access process, the message (Msg4) includes at least one of the following: an uplink and/or downlink resource allocated to the UE by a base station to which the satellite cell belongs and used by the UE in the satellite cell; or a C-RNTI used by the UE in the satellite cell.

In one embodiment of the present disclosure provides a random access device, including: a message reception unit, configured for receiving a random access related message transmitted by a terrestrial cell; and a cell type determination unit, configured for determining a cell type corresponding to the random access related message, and the cell type is the terrestrial cell or a satellite cell.

The random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the determining, by the cell type determination unit, the cell type corresponding to the random access related message includes: determining the cell type corresponding to the random access related message through indication information added to the random access related message; or determining the cell type corresponding to the random access related message through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the device further includes: a timer configuration reception unit, configured for receiving a first contention resolution timer used for contention resolution of contention-based random access of the satellite cell, and a second contention resolution timer used for contention resolution of contention-based random access of the terrestrial cell, which are both configured by a network apparatus, and a time length of the first contention resolution timer is the same as or different from a time length of the second contention resolution timer, and/or a starting time of the first contention resolution timer is different from a starting time of the second contention resolution timer.

In one embodiment, the device further includes: a message transmission unit, configured for transmitting a third message (Msg3) of the four-step contention-based random access to the satellite cell, and the Msg3 carries a C-RNTI used by the UE in the satellite cell.

In one embodiment, the device further includes: a contention resolution unit, configured for determining that the contention resolution succeeds when the random access related message includes at least one of the following: an uplink and/or downlink resource allocated to the UE by a base station to which the satellite cell belongs and used by the UE in the satellite cell; or a C-RNTI used by the UE in the satellite cell.

In one embodiment of the present disclosure provides a random access device, applied to a satellite cell and including: a terrestrial cell determination unit, configured for determining a terrestrial cell accessed by a UE; and a message transmission unit, configured for transmitting a random access related message to the UE through the terrestrial cell, and indicating that a cell type corresponding to the random access related message is the satellite cell.

In a condition that the terrestrial cell and the satellite cell belong to different base stations, the transmitting, by the message transmission unit, the random access related message to the UE through the terrestrial cell, and indicating that the cell type corresponding to the random access related message is the satellite cell includes: exchanging part or all of a content of the random access related message with the terrestrial cell through an inter-base-station interface.

In one embodiment, the exchanging, by the message transmission unit, the part or all of the content of the random access related message with the terrestrial cell through the inter-base-station interface includes: generating, by a base station to which the satellite cell belongs, a complete random access related message, and transmitting the generated random access related message to the terrestrial cell through the inter-base-station interface; or transmitting, by a base station to which the satellite cell belongs, all or part of the content of the random access related message to the terrestrial cell, and a base station to which the terrestrial cell belongs generates a complete random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the indicating, by the message transmission unit, that the cell type corresponding to the random access related message is the satellite cell includes: indicating that the cell type corresponding to the random access related message is the satellite cell through indication information added to the random access related message; or indicating that the cell type corresponding to the random access related message is the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the device further includes: a timer configuration unit, configured for configuring, for the UE, a first contention resolution timer for contention resolution of contention-based random access of the satellite cell, and a time length of the first contention resolution timer is the same as or different from a time length of a second contention resolution timer for contention resolution of contention-based random access of the terrestrial cell; and/or configuring, for the UE, a starting time of a first contention resolution timer for contention resolution of contention-based random access of the satellite cell, and the starting time of the first contention resolution timer is different from a starting time of a second contention resolution timer for contention resolution of contention-based random access of the terrestrial cell.

In one embodiment, the message reception unit is further configured for receiving a third message (Msg3) of the four-step contention-based random access transmitted by the UE, and the Msg3 carries a C-RNTI used by the UE in the satellite cell.

In one embodiment of the present disclosure provides a random access device, applied to a terrestrial cell and including: a message reception unit, configured for receiving a random access related message transmitted by a satellite cell and for a user equipment (UE); and a message transmission unit, configured for transmitting the random access related message to the UE, and indicating that a cell type corresponding to the random access related message is the satellite cell.

In a condition that the terrestrial cell and the satellite cell belong to different base stations, the receiving, by the message transmission unit, the random access related message transmitted by a satellite cell and for the UE includes: exchanging part or all of a content of the random access related message with the satellite cell through an inter-base-station interface.

In one embodiment, the exchanging, by the message transmission unit, part or all of the content of the random access related message with the satellite cell through the inter-base-station interface includes: receiving a complete random access related message transmitted by a base station to which the satellite cell belongs through the inter-base-station interface; or receiving part or all of the content of the random access related message transmitted by the satellite cell through the inter-base-station interface, and generating a complete random access related message according to the part or all of the content of the random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the indicating, by the message transmission unit, that the cell type corresponding to the random access related message is the satellite cell includes: indicating that the cell type corresponding to the random access related message is the satellite cell through indication information added to the random access related message; or indicating that the cell type corresponding to the random access related message is the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the device further includes: a timer configuration unit, configured for configuring, for the UE, a second contention resolution timer for contention resolution of contention-based random access of the terrestrial cell, and a time length of the second contention resolution timer is different from a time length of a first contention resolution timer for contention resolution of contention-based random access of the satellite cell; and/or configuring, for the UE, a starting time of a second contention resolution timer for contention resolution of contention-based random access of the terrestrial cell, and the starting time of the second contention resolution timer is different from a starting time of a first contention resolution timer for contention resolution of contention-based random access of the satellite cell.

In one embodiment, in a condition that the random access related message includes a fourth message (Msg4) in a four-step contention-based random access process, the Msg4 includes at least one of the following: an uplink and/or downlink resource allocated to the UE by a base station to which the satellite cell belongs and used by the UE in the satellite cell; or a C-RNTI used by the UE in the satellite cell.

In one embodiment of the present disclosure provides a computer program medium, storing a computer program, and the computer program implements steps of the random access method as provided in the embodiments described above when executed by a processor, or the computer program implements steps of the random access method as provided in the embodiments described above when executed by a processor, or the computer program implements steps of the random access method as provided in the embodiments described above when executed by a processor.

In the embodiment of the present disclosure, provided is a chip, coupled to a memory in an apparatus, and the chip calls program instructions stored in the memory during running, and to implement all the embodiments described above in the embodiments of the present disclosure, and any possible methods involved all the embodiments.

In one embodiment of the present disclosure, provided is a computer program product. When running on an electronic apparatus, the computer program product causes the electronic apparatus to implement all the embodiments described above in the embodiments of the present disclosure, and any possible methods involved all the embodiments.

The random access method and device provided in the embodiments of the present disclosure have the beneficial effects as follows.

The present disclosure provides the method for random access by the satellite cell with the assistance of the terrestrial cell. According to the method, a random access delay of a satellite communication system may be reduced, and an overhead of the delay is reduced.

DETAILED DESCRIPTION OF THE EMBODIMENTS

The embodiments of the present disclosure will be clearly and completely described below with reference to the accompanying drawings in the embodiments of the present disclosure The described embodiments are merely some, rather than all, of embodiments of the present disclosure.

A 5G random access process is divided into two types of four-step random access involving Msg1 and two-step random access involving MsgA. Both types of random access support contention-based random access (CBRA) and contention-free random access (CFRA).

Figure 1:
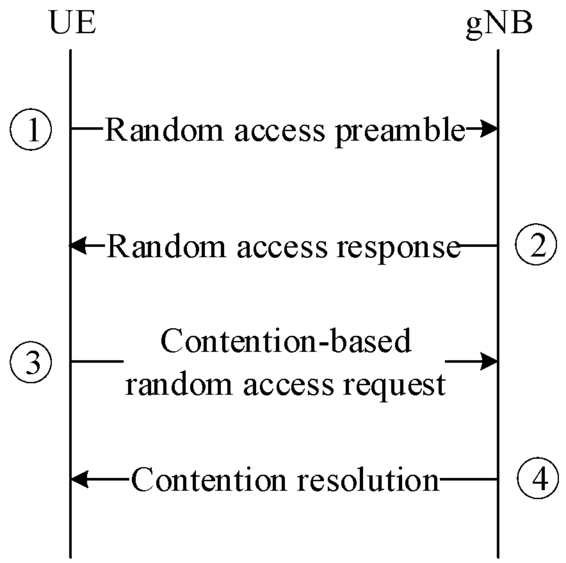
FIG. 1 is a schematic diagram of a four-step random access process based on a contention-based random access (CBRA) in the prior art.

As shown in FIG. 1, a four-step random access process based on CBRA is illustrated, and mainly includes the following.

Step 1, a user equipment (UE) transmits a first message (Msg1) to a network side apparatus gNB (5G base station).

The UE selects a random access preamble and a physical random access channel (PRACH) resource, and transmits the selected preamble to the base station through the PRACH resource.

Step 2, after receiving the message Msg1, the gNB transmits a second message (Msg2), also called a random access response message, to the UE.

A complete Msg2 is one media access control (MAC) protocol data unit (PDU), which may include one or more MAC subPDUs. Each MAC subPDU has a MAC subheader and a payload portion. If the MAC subPDU is an MAC random access response (RAR) subPDU, the MAC subheader of the MAC RAR subPDU includes a random access preamble identity (RAPID). The payload portion of the MAC RAR subPDU includes a timing advance command (TAC), an uplink grant (UL Grant) for Msg3, and a cell-radio network temporary identity (C-RNTI) allocated by a network side. A physical downlink control channel (PDCCH) carrying scheduling information of Msg2 is scrambled with a random access-radio network temporary identity (RA-RNTI), and the RA-RNTI uniquely corresponds to a time-frequency resource for transmitting the Msg1 within a window length in which the UE receives the Msg2. When receiving the Msg2, the UE determines, based on the RA-RNTI and the preamble identity (ID), that the Msg2 corresponds to the Msg1 transmitted by the UE.

Step 3, the UE transmits a third message (Msg3) for contention-based random access to the gNB.

The UE transmits uplink transmission on a UL grant allocated by the Msg2, where the uplink transmission transmitted through the Msg3 has different contents for different random access reasons. For example, for initial access, a connection establishment request of radio resource control (RRC) is transmitted through the Msg3.

Step 4, after receiving the third message (Msg3), the gNB transmits a fourth message (Msg4) of contention resolution to the UE.

The UE may determine whether random access succeeds according to the Msg4. For the UE performing initial access, the C-RNTI is automatically converted into a unique C-RNTI of the UE in the cell after the contention resolution succeeds.

Figure 2:
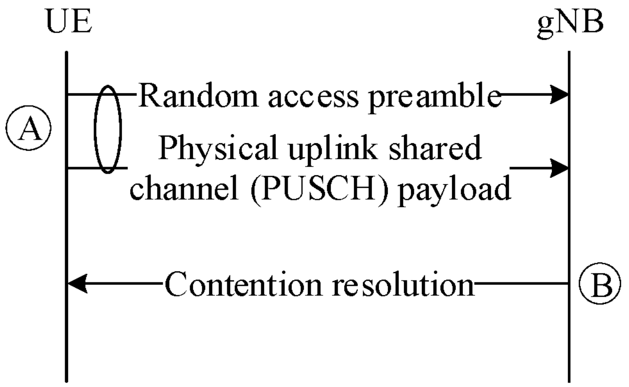
FIG. 2 is a schematic diagram of a two-step random access process based on CBRA in the prior art.

As shown in FIG. 2, a two-step random access process based on CBRA is illustrated, and mainly includes the following.

Step A, a UE transmits a first message (MsgA) to a gNB, and the MsgA carries a random access preamble and a physical uplink shared channel (PUSCH).

The MsgA corresponds to (Msg1+Msg3) of the four-step random access (RA), and includes a random access code portion and a data portion, which may be decoded independently. The random access code portion is used for transmitting a preamble code, i.e., a random access code preamble of the Msg1 in the four-step random access (RA). The data portion is similar to the Msg3 in the four-step random access (RA), and may include a UE identity (such as the C-RNTI), an RRC message (such as the connection establishment request of the RRC), a buffer status report (BSR) or data volume (DV), a power headroom report (PHR), and uplink data.

Step B, after the gNB receives the PUSCH scrambled with the RA-RNTI and the random access preamble, the gNB determines, according to a resource position at which the random access preamble is received, the RA-RNTI, and transmits a second message (MsgB) of contention resolution to the UE after correctly descrambling the PUSCH through the RA-RNTI.

Figure 3:
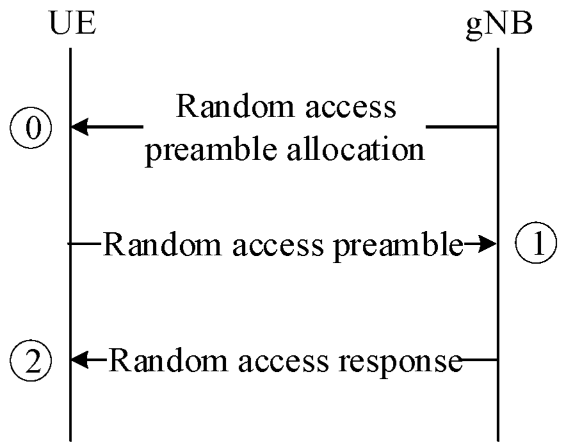
FIG. 3 is a schematic diagram of a four-step random access process based on contention-free random access (CFRA) in the prior art.

As shown in FIG. 3, a four-step random access process based on CFRA is illustrated, and mainly includes the following.

Step 0, a gNB transmits a first message (Msg0) carrying a random access preamble to UE.

The gNB allocates a dedicated preamble for CFRA and a PRACH resource for random access to the UE through the Msg0.

Step 1, after receiving the Msg0, the UE transmits a second message (Msg1) to the gNB.

The UE transmits, according to an indication of the Msg0, the allocated dedicated preamble to the gNB on the allocated PRACH resource.

Step 2, after receiving the Msg1, the gNB transmits a third message (Msg2) as a random access response to the UE.

After receiving the Msg1, the gNB calculates, according to the Msg1, an uplink timing advance command (TAD). The gNB transmits a random access response message to the UE. A random access response includes timing advance command information, and a subsequent resource for uplink transmission (UL grant). The time advance is used for a timing relation of subsequent uplink transmission of the UE.

Figure 4:
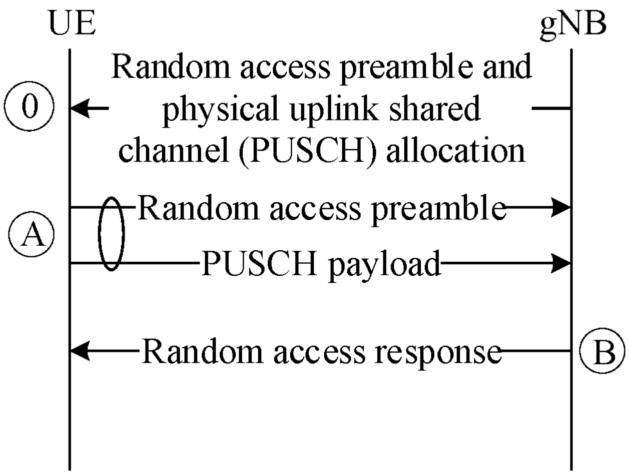
FIG. 4 is a schematic diagram of a two-step random access process based on CFRA in the prior art.

As shown in FIG. 4, a two-step random access process based on CFRA is illustrated, and mainly includes the following.

Step 0, a gNB transmits a message (Msg0) carrying a random access preamble and PUSCH allocation to UE.

Step A, after receiving the message (Msg0), the UE transmits a random access preamble and a PUSCH to the gNB through a first message (MsgA).

Step B, after receiving the PUSCH scrambled with an RA-RNTI and the random access preamble, the gNB determines, according to a resource location at which the random access preamble is received, the RA-RNTI, and transmits a second message (MsgB) to the UE after correctly descrambling the PUSCH through the RA-RNTI.

In one embodiment, reference may be made to contents defined in a protocol for the content carried in each message in the random access process described above, and processing by the UE and the gNB, which will not be described in detail here.

When the UE transmits signals through a satellite cell and a terrestrial cell, a long delay difference is caused, and the satellite cell has a longer delay than the terrestrial cell. According to an existing 5G terrestrial mobile communication system design, the random access process is limited to an MAC entity. Generally, the satellite cell and the terrestrial cell will correspond to different MAC entities. According to a design concept of the existing mobile communication system, a random access process of the satellite cell may only be implemented through the satellite cell, resulting in an extremely long random access delay, and influencing user experience.

In view of the problems described above, the embodiments of the present disclosure provide a random access method and device on a terminal side, and a random access method and device on a network side, to reduce an overhead of the time delay of random access in a satellite communication system.

The method and device are based on the same concept. Since the method and device have the similar principles for solving problems, the device and method may be implemented upon reference to each other, without repeated portions described in detail.

The embodiment of the present disclosure may be applicable to a mobile communication system related to a satellite.

A terminal apparatus involved in the embodiments of the present disclosure may be an apparatus providing voice and/or data transmission for a user, a handheld apparatus having a wireless connection function, or another processing apparatus connected to a wireless modem. In different systems, the terminal apparatuses may have different names. For example, in a 5G system, the terminal apparatus may be called a user equipment (UE). Wireless terminal apparatuses may communicate with one or more core networks via a radio access network (RAN), and may be mobile terminal apparatuses, such as mobile phones (or "cellular" phones) and computers having mobile terminal apparatuses. For example, the mobile terminal apparatuses may be portable, pocket, handheld, intra-computer, or vehicle-mounted mobile devices, which exchange language and/or data with a radio access network. For example, the mobile terminal apparatuses may be a personal communication service (PCS) phone, a cordless phone, a session initiated protocol (SIP) phone, a wireless local loop (WLL) station, a personal digital assistant (PDA), etc. The wireless terminal apparatuses may also be called a system, a subscriber device, a subscriber station, a mobile station, a mobile, a remote station, an access point, a remote terminal, an access terminal, a user terminal, a user agent, and a user device, which are not limited in the embodiments of the present disclosure.

A network apparatus involved in the embodiments of the present disclosure may be a base station, and the base station may include multiple cells. Depending on a specific application scenario, a base station may also be called an access point, or may refer to an apparatus in an access network, which communicates with a wireless terminal apparatus through one or more sectors on an air interface, or may be called differently. The network apparatus may be configured for converting received air frames to and from Internet protocol (IP) packets, and act as a router between the wireless terminal apparatus and the rest of the access network, where the rest of the access network may include an Internet protocol (IP) communication network. The network apparatus may also coordinate attribute management for the air interface. The network apparatus involved in the embodiments of the present disclosure may be, for example, a global system for mobile communications (GSM) or a base transceiver station (BTS) in code division multiple access (CDMA), a network apparatus (NodeB) in wide-band code division multiple access (WCDMA), an evolutional network device (Evolutional Node B, eNB or e-NodeB) in a long term evolution (LTE) system, a next generation (5G) base station in a next generation system, a home evolved station (Home Evolved node B, HeNB), a relay node, a home station (femto), a picocell base station (pico), etc., which are not limited in the embodiments of the present disclosure.

Each embodiment of the present disclosure will be described in detail below in conjunction with the accompanying drawings of the description. It should be noted that the description order of the embodiments of the present disclosure only represents the order of the embodiments, instead of the order of superiority of the embodiments.

Embodiment 1

Figure 5:
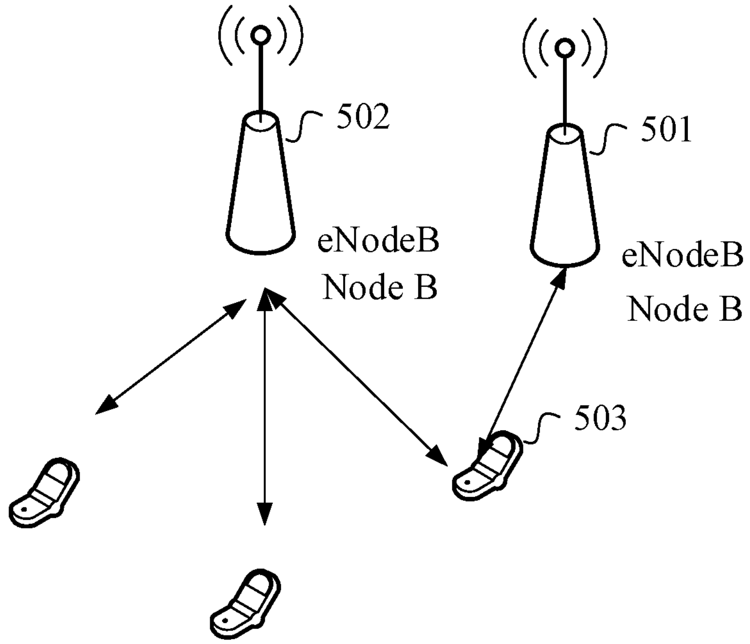
FIG. 5 is a schematic diagram of a random access system provided in an embodiment of the present disclosure.

As shown in FIG. 5, the present disclosure provides a random access system, including a base station 501, a base station 502 and a user equipment (UE) 503.

The base station 501, to which a satellite cell belongs, is configured for determining a terrestrial cell accessed by the UE, transmitting a random access related message to the UE through the terrestrial cell, and indicating that a cell type corresponding to the random access related message is the satellite cell.

The base station 502, to which a terrestrial cell belongs, is configured for receiving a random access related message for the UE transmitted by the satellite cell, transmitting the random access related message to the UE, and indicating that the cell type corresponding to the random access related message is the satellite cell.

The UE 503, is configured for receiving a random access related message transmitted by the terrestrial cell, and determining the cell type corresponding to the random access related message, where the cell type is the terrestrial cell or the satellite cell.

The UE may work both in the satellite cell and the terrestrial cell, to integrate two types of cell resources in, for example, a dual connection manner. When dual connection is established, the base station to which the satellite cell belongs may be informed of a base station serving the terrestrial cell accessed by the UE, that is, the base station to which the terrestrial cell belongs.

The random access process described above may be a four-step contention-based random access process. The base station to which the satellite cell belongs transmits the random access related message to the UE through the base station to which the terrestrial cell belongs, that is, the random access related message received by the UE from the terrestrial cell is the second message (Msg2) and/or the fourth message (Msg4) of the four-step contention-based random access.

In one embodiment, the random access process described above may be a two-step contention-based random access process. The base station to which the satellite cell belongs transmits the random access related message to the UE through the base station to which the terrestrial cell belongs, that is, the random access related message received by the UE from the terrestrial cell is the second message (MsgB) of the two-step contention-based random access.

In one embodiment, the random access process described above may be a four-step contention-free random access process. The base station to which the satellite cell belongs transmits the random access related message to the UE through the base station to which the terrestrial cell belongs, that is, the random access related message received by the UE from the terrestrial cell is the first message (Msg0) and the third message (Msg2) of the four-step contention-free random access.

If the terrestrial cell and the satellite cell belong to the same base station, an exchange between the terrestrial cell and the satellite cell is implemented within the base station. If the terrestrial cell and the satellite cell belong to different base stations, the satellite cell is required to exchange part or all of a content of the random access related message with the terrestrial cell through an inter-base-station interface, and the base station to which the terrestrial cell belongs transmits the random access related message to the UE, and indicates that the cell type corresponding to the random access related message is the satellite cell.

When the base station to which the satellite cell belongs transmits the random access related message through the terrestrial cell, in order to enable the UE to distinguish cell types corresponding to random access related messages, in the present embodiment, the base station to which the satellite cell belongs is required to indicate the cell type corresponding to a random access related message to the UE through the terrestrial cell while transmitting the random access related message through the terrestrial cell.

In a random access system provided in the embodiment of the present disclosure, in the random access process, the satellite cell transmits the random access related message through the terrestrial cell, and to provide a solution to random access by the satellite cell with the assistance of the terrestrial cell, to reduce a random access delay of a satellite communication system.

The random access related message exchanged through the inter-base-station interface includes: the base station to which the satellite cell belongs generates a complete random access related message, and transmits the generated random access related message to the terrestrial cell through the inter-base-station interface. In one embodiment, the base station to which the satellite cell belongs transmits all or part of a content of the random access related message to the terrestrial cell, and the base station to which the terrestrial cell belongs generates a complete random access related message.

When the random access process is the four-step contention-based random access process, the base station to which the satellite cell belongs may exchange part or all of a content of the second message (Msg2), or a complete Msg2 of the four-step contention-based random access with the base station to which the terrestrial cell belongs through the inter-base-station interface.

When the random access process is the two-step contention-based random access process, the base station to which the satellite cell belongs may exchange part or all of a content of the second message (MsgB), or a complete MsgB of the two-step contention-based random access with the base station to which the terrestrial cell belongs through the inter-base-station interface.

When the random access process described above is the four-step contention-free random access process, the base station to which the satellite cell belongs may exchange part or all of a content of the third message (Msg2), or a complete Msg2 of the four-step contention-free random access with the base station to which the terrestrial cell belongs through the inter-base-station interface.

The step that the satellite cell indicates the cell type corresponding to the random access related message through the terrestrial cell, and the UE determines the cell type corresponding to the random access related message may be implemented in any one of the following manners.

1) The cell type corresponding to the random access related message is indicated as the satellite cell through indication information added to the random access related message.

The base station to which the satellite cell belongs adds the indication information to the random access related message, and transmits a random access related message added with the indication information to the terrestrial cell.

In one embodiment, the base station to which the satellite cell belongs transmits the random access related message to the base station to which the terrestrial cell belongs, and the base station to which the terrestrial cell belongs adds indication information to the random access related message.

The UE determines the cell type corresponding to the random access related message through the indication information added to the random access related message.

In one embodiment, the indication information described above includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

The possible implementations of the indication information will be described below according to different random access methods employed.

1.1) The Four-Step Contention-Based Random Access Process

The indication information added to the random access related message described above includes indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access.

In one embodiment, the indication information may be, but is not limited to, one or a combination of the following: a cell group identity to which the Msg2/Msg4 corresponds; a TAG identity to which the Msg2/Msg4 corresponds; a cell identity and/or a frequency point identity to which the Msg2/Msg4 corresponds; a cell type identity to which the Msg2/Msg4 corresponds, and the cell type includes the satellite cell and the terrestrial cell; a C-RNTI used by the UE in a cell corresponding to the Msg2/Msg4; or cell indication information corresponding to an uplink and/or downlink resource allocated by the Msg2/Msg4.

In the random access method, the UE transmits a third message (Msg3) of the four-step contention-based random access to the satellite cell, and the Msg3 carries a C-RNTI used by the UE in the satellite cell. The base station to which the satellite cell belongs receives the third message (Msg3) of the four-step contention-based random access transmitted by the UE, and the Msg3 carries the C-RNTI used by the UE in the satellite cell.

When the random access related message transmitted by the base station to which the terrestrial cell belongs to the UE includes a fourth message (Msg4) in the four-step contention-based random access process, the Msg4 includes at least one of the following: an uplink and/or downlink resource allocated to the UE by a base station to which the satellite cell belongs and used by the UE in the satellite cell; or a C-RNTI used by the UE in the satellite cell.

In a running period of a contention resolution timer corresponding to contention-based random access of the satellite cell, the UE determines that a contention resolution succeeds, if it is determined that the random access related message (Msg4) indicating that the cell type is the satellite cell is received and the Msg4 includes at least one of the following: an uplink and/or downlink resource allocated to the UE by a base station to which the satellite cell belongs and used by the UE in the satellite cell; or a C-RNTI used by the UE in the satellite cell.

1.2) the Two-Step Contention-Based Random Access Process

The indication information added to the random access related message includes indication information added to an MAC subheader or a payload portion in an RAR MAC PDU corresponding to the second message (MsgB) of the two-step contention-based random access.

In order to identify between an MsgB of the terrestrial cell itself and an MsgB for the satellite cell, the indication information may be added to the subheader corresponding to the MsgB, or to a payload portion of the MAC PDU (such as a successRAR or fallbackRAR). In one embodiment, the indication information may be one or a combination of the following: a cell group identity to which the MsgB corresponds; a TAG identity to which the MsgB corresponds; a cell identity and/or a frequency point identity to which the MsgB corresponds; a cell type identity to which the MsgB corresponds; a C-RNTI allocated by a cell corresponding to the MsgB; or cell indication information corresponding to an uplink and/or downlink resource allocated by the MsgB.

1.3) The Four-Step Contention-Free Random Access Process

The indication information added to the random access related message includes indication information added to the first message (Msg0) of the four-step contention-free random access, and/or indication information added to an MAC subheader or a payload portion in an RAR MAC PDU corresponding to the third message (Msg2) of the four-step contention-free random access.

The above indication information added to the Msg0/Msg2 may be at least one of the following: a cell group identity to which the Msg0/2 corresponds; a TAG identity to which the Msg0/2 corresponds; a cell identity and/or a frequency point identity to which the Msg0/2 corresponds; a cell type identity to which the Msg0/2 corresponds; a C-RNTI allocated by a cell corresponding to the Msg0/2; or cell indication information corresponding to an uplink and/or downlink resource allocated by the Msg0/2.

2) An RNTI scrambled in the random access related message is used to indicate that the cell type corresponding to the random access related message is the satellite cell.

The base station to which the terrestrial cell belongs utilizes the RNTI scrambled in the random access related message, to indicate that the cell type corresponding to the random access related message is the satellite cell.

The UE utilizes the RNTI scrambled in the random access related message, to determine the cell type corresponding to the random access related message.

The method is applicable to the situation that a content of the message transmitted by the base station to which the satellite cell belongs is different from a content of the message transmitted by the base station to which the terrestrial cell belongs in the random access process.

When the random access method of the contention-based random access is employed in the implementation, in the present embodiment, a network side configures, for the UE, a first contention resolution timer for contention resolution of contention-based random access of the satellite cell, and configures, for the UE, a second contention resolution timer for contention resolution of contention-based random access of the terrestrial cell. A time length of the first contention resolution timer is the same as or different from a time length of the second contention resolution timer; and/or a starting time of the first contention resolution timer is different from a starting time of the second contention resolution timer.

The first contention resolution timer used for the contention resolution of the contention-based random access of the satellite cell and the second contention resolution timer used for the contention-based random access of the terrestrial cell, which are configured by a network apparatus, are received, and a time length of the first contention resolution timer is the same as or different from a time length of the second contention resolution timer, and/or a starting time of the first contention resolution timer is different from a starting time of the second contention resolution timer.

In one embodiment, the base station to which the satellite cell belongs configures, for the UE, a first contention resolution timer for contention resolution of contention-based random access of the satellite cell, and the base station to which the terrestrial cell belongs configures, for the UE, a second contention resolution timer for contention resolution of contention-based random access of the terrestrial cell.

Specific random access processes in the embodiments of the present disclosure are described below in combination with different random access methods.

Implementation 1

In the present implementation, a four-step random access process based on CBRA on a satellite cell is implemented through a terrestrial cell.

It is assumed that the terrestrial cell serves as a master cell group (MCG), the satellite cell serves as a secondary cell group (SCG), and the random access process is four-step random access based on CBRA. The process is also applicable to the case that the terrestrial cell serves as a SCG, and the satellite cell serves as an MCG.

The MCG and SCG are concepts under dual connectivity (DC) which means that a UE may access multiple base stations at the same time.

In the present embodiment describes the random access process, on the satellite cell (serving as the SCG), of the UE include, but are not limited to: 1) obtaining uplink synchronization, on the satellite cell, of the UE; and 2) obtaining an uplink resource, on the satellite cell, of the UE.

Figure 6:
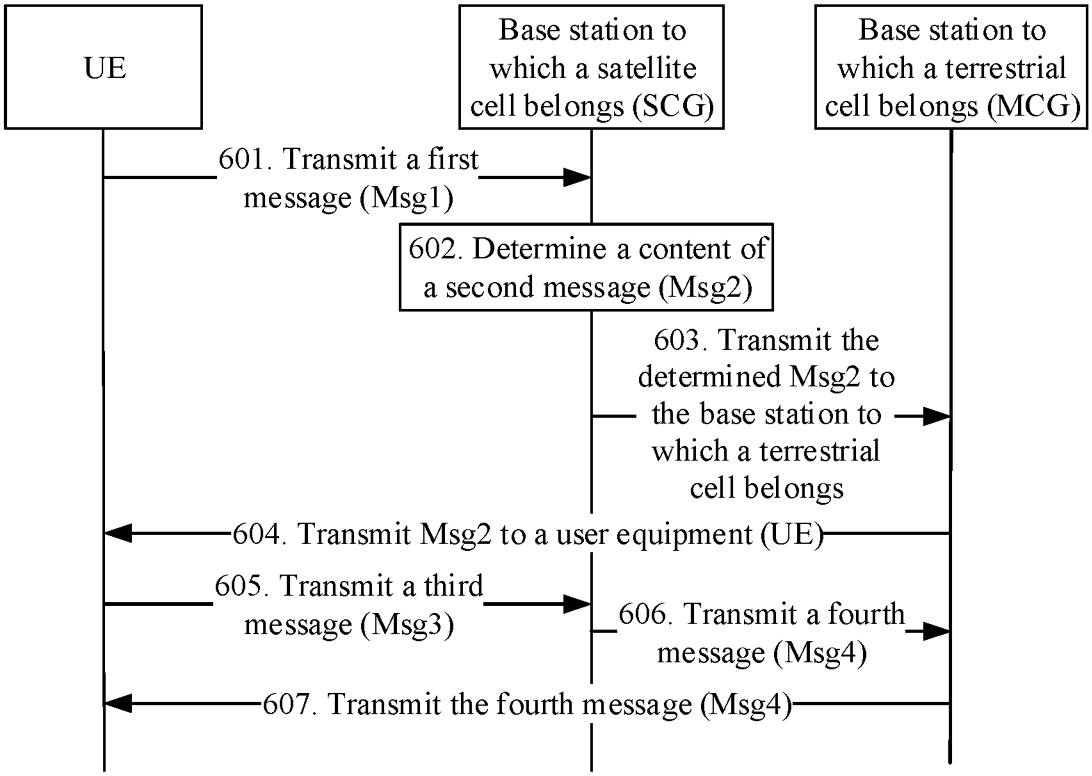
FIG. 6 is a schematic diagram of a four-step random access process based on CBRA in an embodiment of the present disclosure.

As shown in FIG. 6, all steps of the random access process are specifically described as follows.

Step 601, the UE transmits a first message (Msg1) of four-step contention-based random access to the satellite cell.

The first message (Msg1) described above specifically multiplexes a preamble transmission process corresponding to an Msg1 defined in an existing third generation partnership project (3GPP) protocol.

Step 602, a base station to which the satellite cell belongs determines a content of a second message (Msg2) of the four-step contention-based random access.

The base station to which the satellite cell belongs receives the message (Msg1) transmitted by the UE, and determines, according to the message (Msg1), the content of the message (Msg2).

Step 603, the base station to which the satellite cell belongs exchanges all or part of the content of the message (Msg2) for the UE with a base station to which the terrestrial cell belongs.

If the satellite cell and the terrestrial cell belong to the same base station, the present step may be omitted. If the satellite cell and the terrestrial cell belong to different base stations, an inter-base-station interface is required to be introduced for an exchange. In one embodiment, a complete message (Msg2) or part or all of the content of the message (Msg2) may be exchanged through the inter-base-station interface.

If the message (Msg2) is encapsulated in the base station to which the satellite cell belongs, the complete message (Msg2) may be directly exchanged.

If the message (Msg2) is encapsulated in the base station to which the terrestrial cell belongs, part or all of the content of the message (Msg2) may be exchanged.

Step 604, the base station to which the terrestrial cell belongs transmits a second message (Msg2) to the UE, and indicates that a cell type corresponding to the second message (Msg2) is the satellite cell.

In order to identify between the Msg2 of the terrestrial cell itself and the Msg2 for the satellite cell, first indication information is required to be added to an MAC subheader or an RAR MAC PDU corresponding to the Msg2, and the first indication information may be, but is not limited to, one or a combination of the following: 1) a cell group identity to which the Msg2 corresponds (for example, if 1 bit is used to identify the MCG/SCG, and set as 1, it is indicated that the Msg2 is for the MCG, and otherwise the Msg2 is for the SCG); 2) a TAG identity to which the Msg2 corresponds (for example, if the MCG and the SCG have different TAG IDs, they may be distinguished from each other through the TAG IDs. If the MCG and the SCG may have the same TAG ID, other identities are required to be combined to distinguish the Msg2 is for the satellite cell or for the terrestrial cell); 3) a cell identity and/or a frequency point identity to which the Msg2 corresponds; 4) a cell type identity to which the Msg2 corresponds; (the cell identity may be the cell type identity (for example, 1 bit represents the satellite cell and the terrestrial cell with 0/1, respectively, which may be indicated through a reserved R bit field in an existing RAR MAC PDU) or a cell ID); 5) a C-RNTI used by the UE in a cell corresponding to the Msg2; or (if indication information is added to the RAR MAC PDU, an RAR MAC PDU corresponding to the satellite cell and an RAR MAC PDU corresponding to the terrestrial cell may differ from each other in format); 6) or, cell indication information corresponding to an uplink and/or downlink resource allocated by the Msg2.

Step 605, the UE transmits a third message (Msg3) to the base station to which the satellite cell belongs.

For the message (Msg3), the message (Msg3) at least carries a C-RNTI used by the UE in the satellite cell.

Step 606, the base station to which the satellite cell belongs exchanges all or part of a content of a fourth message (Msg4) for the UE with the base station to which the terrestrial cell belongs.

If the satellite cell and the terrestrial cell belong to different base stations, an inter-base-station interface is required to be introduced for exchange. A complete Msg4 or part or all of the content of the Msg4 may be exchanged through the inter-base-station interface.

If the Msg4 is encapsulated in the base station to which the satellite cell belongs, the complete message (Msg4) may be directly exchanged.

If the Msg4 is encapsulated in the base station to which the terrestrial cell belongs, part or all of the content of the Msg4 may be exchanged.

The specific content of the message (Msg4) may be, but is not limited to: an uplink and/or downlink resource, in the satellite cell, allocated to the UE by the satellite cell; or a C-RNTI, in the satellite cell, of the UE.

Step 607, the UE receives a fourth message (Msg4) through the base station to which the terrestrial cell belongs.

The base station to which the terrestrial cell belongs receives the message (Msg4) for the UE from the base station to which the satellite cell belongs, and then transmits the message (Msg4) to the UE. A network may configure contention resolution timers with different time lengths for contention resolution of contention-based random access for the UE, which are used for receiving the Msg4 for the terrestrial cell and the Msg4 for the satellite cell, respectively. And/or the times at which the UE starts the contention resolution timers may also be different.

Further, for the satellite cell, it is determined that the contention resolution succeeds when the UE receives one of the following information during a running period of the contention resolution timer corresponding to the satellite cell. The UE receives uplink and/or downlink scheduling information for the satellite cell in the terrestrial cell. The MAC PDU received by the UE in the terrestrial cell includes a C-RNTI MAC control element (CE) used by the UE in the satellite cell.

Implementation 2

In the present implementation, a two-step random access process based on CBRA on a satellite cell is implemented through a base station to which the terrestrial cell belongs.

It is assumed that the terrestrial cell serves as an MCG, the satellite cell serves as an SCG, and the random access process is two-step random access based on CBRA. When the terrestrial cell serves as the SCG, and the satellite cell serves as the MCG, the UE generally does not use the two-step random access based on CBRA on the satellite cell.

In the present embodiment describes the random access process, on the satellite cell, of the UE include, but are not limited to: 1) obtaining uplink synchronization, on the satellite cell of the UE; and 2) obtaining an uplink resource, on the satellite cell, of the UE.

Figure 7:
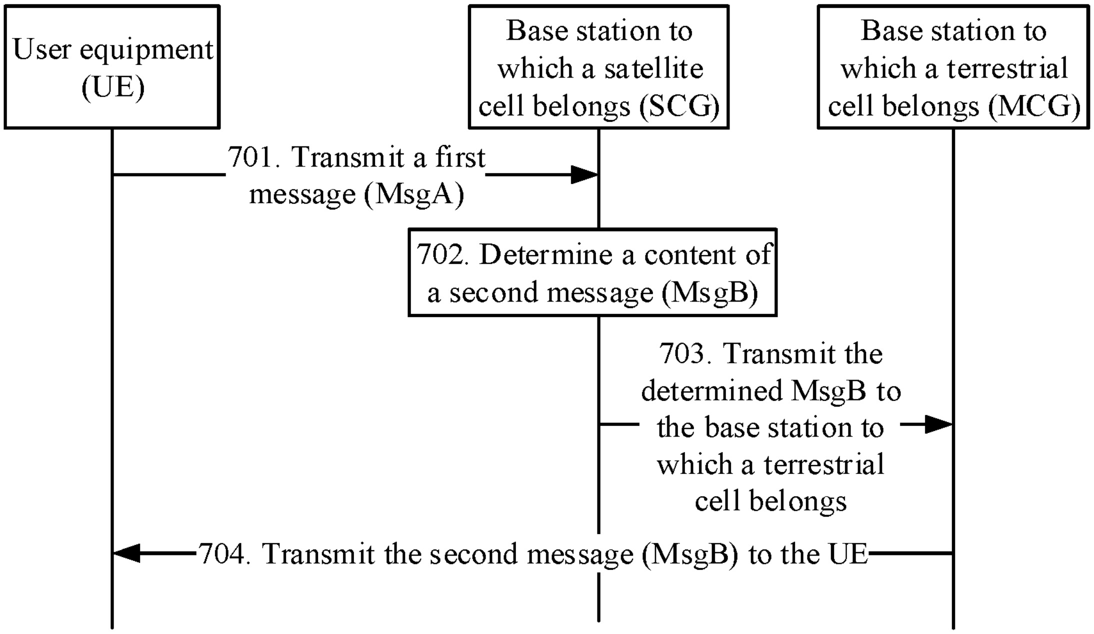
FIG. 7 is a schematic diagram of a two-step random access process based on CBRA in an embodiment of the present disclosure.

As shown in FIG. 7, specifically, all steps of the random access are described as follows.

Step 701, the UE transmits a first message (MsgA) of two-step contention-based random access to a base station to which the satellite cell belongs.

The message (MsgA) includes two parts: a preamble and a PUSCH, and specifically multiplexes an MsgA transmission process defined in an existing 3GPP protocol.

Step 702, the base station to which the satellite cell belongs determines a content of a second message (MsgB).

The base station to which the satellite cell belongs receives the message (MsgA) transmitted by the UE, and determines, according to the message (MsgA), the content of the message (MsgB).

Step 703, the base station to which the satellite cell belongs exchanges all or part of a content of a message (MsgB) for the UE with a base station to which the terrestrial cell belongs.

If the satellite cell and the terrestrial cell belong to the same base station, the present step may be omitted. If the satellite cell and the terrestrial cell belong to different base stations, an inter-base-station interface is required to be introduced for an exchange. In one embodiment, a complete message (MsgB) or part or all of the content of the message (MsgB) may be exchanged through the inter-base-station interface.

If the message (MsgB) is encapsulated in the base station to which the satellite cell belongs, the complete message (MsgB) may be directly exchanged.

If the message (MsgB) is encapsulated in the base station to which the terrestrial cell belongs, part or all of the content of the message (MsgB) may be exchanged.

Step 704, the base station of the terrestrial cell transmits a second message (MsgB) to the UE, and indicates that a cell type corresponding to the MsgB is the satellite cell.

Figure 18:
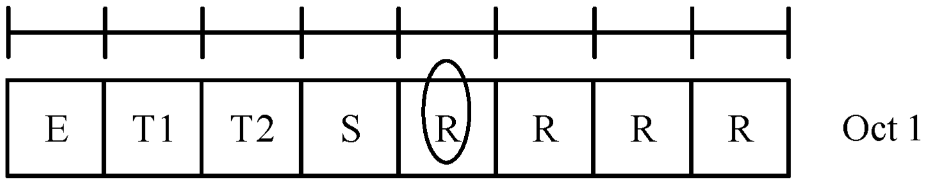
FIG. 18 is a schematic diagram of utilizing an existing reserved bit field (R) in a subheader corresponding to a success random access response (successRAR), to indicate whether a cell type corresponding to the successRAR is a satellite cell or a terrestrial cell in an embodiment of the present disclosure.

Second indication information may be added to a subheader or an MAC PDU (such as a successRAR or fallbackRAR) corresponding to the MsgB. In one embodiment, the second indication information may be one or a combination of the following: a cell group identity to which the MsgB corresponds; a TAG identity to which the MsgB corresponds; a cell identity and/or a frequency point identity to which the MsgB corresponds; a cell type identity to which the MsgB corresponds (for example, an existing reserved bit field (R) may be used in the subheader corresponding to the successRAR, to indicate whether the cell type corresponding to the successRAR is the satellite cell or the terrestrial cell. A specific format is shown in FIG. 18); a C-RNTI allocated by a cell corresponding to the MsgB; or cell indication information corresponding to an uplink and/or downlink resource allocated by the MsgB.

If the indication information is added to the MAC PDU corresponding to the MsgB, an MAC PDU corresponding to the MsgB of the satellite cell and an MAC PDU corresponding to the MsgB of the terrestrial cell may differ from each other in format.

A network may configure different MsgB reception windows for the UE, which are used for receiving the MsgB for the terrestrial cell and the MsgB for the satellite cell, respectively. A contention resolution success determination process is the same as that in the existing two-step random access process based on CBRA, and will not be described in detail herein.

Implementation 3

In the present implementation, a four-step random access process based on CFRA on a satellite cell is implemented through a terrestrial cell.

Figure 8:
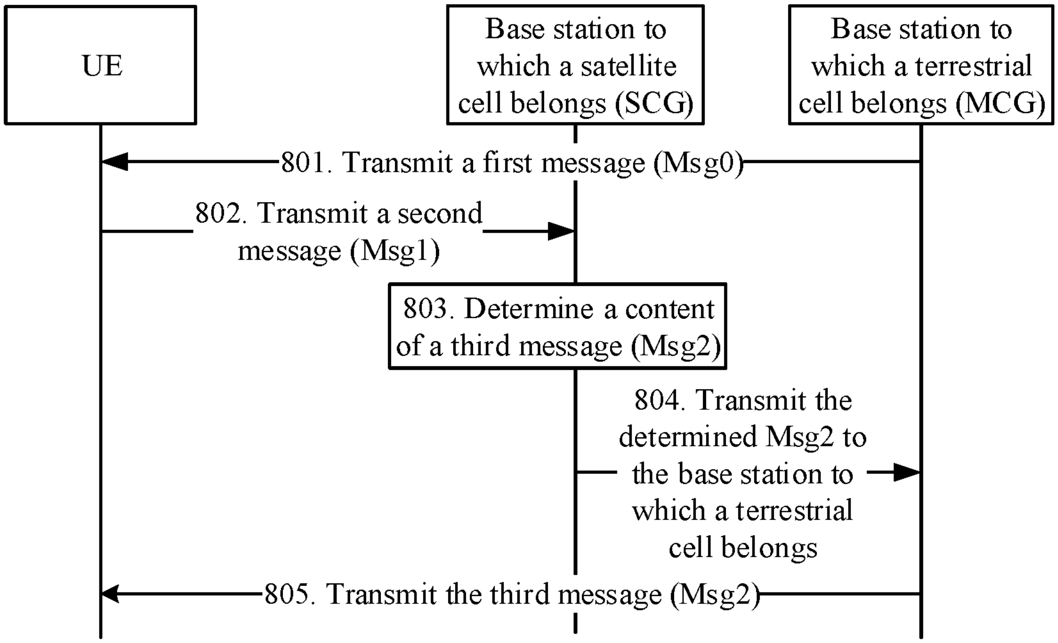
FIG. 8 is a schematic diagram of a four-step random access process based on CFRA in an embodiment of the present disclosure.

It is assumed that the terrestrial cell serves as an MCG, the satellite cell serves as an SCG, and the random access process is four-step random access based on CFRA. In the present embodiment describes the random access process, on the satellite cell (serving as the SCG), of the UE include, but are not limited to: obtaining uplink synchronization, on the satellite cell of the UE. As shown in FIG. 8, specifically, all steps in the executed random access process are described as follows.

Step 801, a base station to which the satellite cell belongs transmits a first message (Msg0) to UE through the terrestrial cell.

Third indication information is required to be added to the first message (Msg0), and the third indication information is used for indicating whether the Msg0 is for the satellite cell or the terrestrial cell. The third indication information may be one or a combination of the following: a cell group identity to which the Msg0 corresponds; a TAG identity to which the Msg0 corresponds; a cell identity and/or a frequency point identity to which the Msg0 corresponds; a cell type identity to which the Msg0 corresponds; or a C-RNTI allocated by a cell corresponding to the Msg0.

Step 802, after receiving the Msg0, the UE transmits a second message (Msg1) of a four-step contention-free random access process to the base station to which the satellite cell belongs.

The message (Msg1) carries a preamble, and specifically multiplexes a preamble transmission process corresponding to the Msg1 of the CFRA defined in an existing 3GPP protocol.

Step 803, the base station to which the satellite cell belongs receives the message (Msg1) transmitted by the UE, and determines, according to the message (Msg1), a content of the message (Msg2).

Step 804, the base station to which the satellite cell belongs exchanges all or part of a content of a message (Msg2) for the UE with a base station to which the terrestrial cell belongs.

If the satellite cell and the terrestrial cell belong to the same base station, the present step may be omitted. If the satellite cell and the terrestrial cell belong to different base stations, an inter-base-station interface is required to be introduced for an exchange. In one embodiment, a complete Msg2 or part or all of the content of the Msg2 may be exchanged through the inter-base-station interface.

If the Msg2 is encapsulated in the base station of the satellite cell, the complete message (Msg2) may be directly exchanged.

If the message (Msg2) is encapsulated in the base station of the terrestrial cell, part or all of the content of the message (Msg2) may be exchanged.

Step 805, the base station to which the terrestrial cell belongs transmits an Msg2 for the satellite cell to the UE.

In order to identify between the Msg2 of the terrestrial cell and the Msg2 for the satellite cell, third indication information is required to be added to an MAC subheader or an RAR MAC PDU corresponding to the Msg2, and the third indication information may be, but is not limited to, at least one of the following: 1) A cell group identity to which the Msg2 corresponds (for example, if 1 bit is used for identifying the MCG/SCG, and set as 1, it is indicated that the Msg2 is for the MCG, and otherwise the Msg2 is for the SCG); 2) a TAG identity to which the Msg2 corresponds (for example, if the MCG and the SCG have different TAG IDs, the MCG and the SCG may be distinguished from each other through the TAG IDs. If the MCG and the SCG may have the same TAG ID, other identities are required to be combined to distinguish whether the Msg2 is for the satellite cell or the terrestrial cell); 3) a cell identity and/or a frequency point identity to which the Msg2 corresponds; 4) a cell type identity to which the Msg2 corresponds (specifically, the cell identity may be a cell type identity (for example, 1 bit represents the satellite cell and the terrestrial cell with 0/1, respectively, which may be indicated through a reserved R bit field in an existing RAR MAC PDU) or a cell ID); 5) a C-RNTI used by the UE in a cell corresponding to the Msg2; or 6) cell indication information corresponding to an uplink and/or downlink resource allocated by the Msg2.

If indication information is added to the RAR MAC PDU, an RAR MAC PDU corresponding to the satellite cell and an RAR MAC PDU corresponding to the terrestrial cell may differ from each other in format.

Embodiment 2

Figure 9:
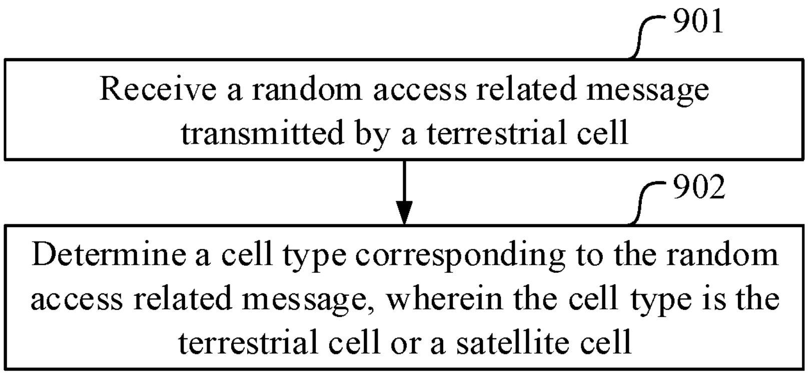
FIG. 9 is a flow chart of a random access method performed by a user equipment (UE) in an embodiment of the present disclosure.

The embodiment of the present disclosure provides a random access method performed by a user equipment (UE). As shown in FIG. 9, the method includes the following.

Step 901, a random access related message transmitted by a terrestrial cell is received.

Step 902, a cell type corresponding to the random access related message is determined, and the cell type is the terrestrial cell or a satellite cell.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the step that a cell type corresponding to the random access related message is determined includes: the cell type corresponding to the random access related message is determined through indication information added to the random access related message; or the cell type corresponding to the random access related message is determined through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the method further includes the following. A first contention resolution timer used for contention resolution of contention-based random access of the satellite cell and a second contention resolution timer used for contention resolution of contention-based random access of the terrestrial cell, which are both configured by a network apparatus, are received, and a time length of the first contention resolution timer is the same as or different from a time length of the second contention resolution timer, and/or a starting time of the first contention resolution timer is different from a starting time of the second contention resolution timer.

In one embodiment, the method further includes the following. A third message (Msg3) of the four-step contention-based random access is transmitted to the satellite cell, and the Msg3 carries a C-RNTI used by the UE in the satellite cell.

In one embodiment, the method further includes the following. It is determined that the contention resolution succeeds if the random access related message includes at least one of the following: an uplink and/or downlink resource allocated to the UE by a base station to which the satellite cell belongs and used by the UE in the satellite cell; or a C-RNTI used by the UE in the satellite cell.

Figure 10:
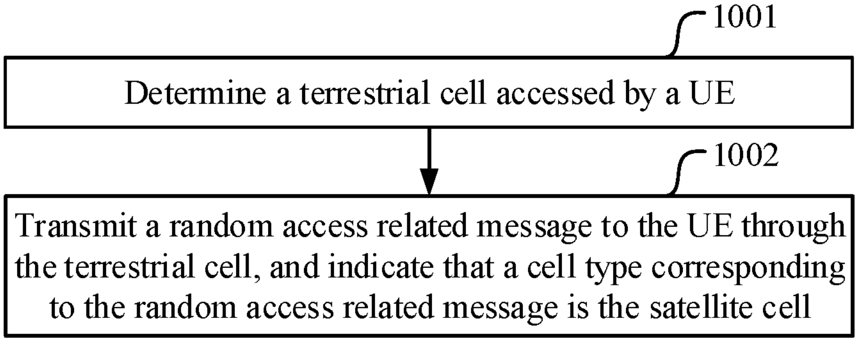
FIG. 10 is a flow chart of a random access method performed by a base station to which a satellite cell belongs in an embodiment of the present disclosure.

An embodiment of the present disclosure provides a random access method performed by a base station to which a satellite cell belongs. As shown in FIG. 10, the method includes the following.

Step 1001, a terrestrial cell accessed by a UE is determined.

Step 1002, a random access related message is transmitted to the UE through the terrestrial cell, and a cell type corresponding to the random access related message is indicated as the satellite cell.

In one embodiment, if the terrestrial cell and the satellite cell belong to different base stations, the step that the random access related message is transmitted to the UE through the terrestrial cell and the cell type corresponding to the random access related message is indicated as the satellite cell includes: part or all of a content of the random access related message is exchanged with the terrestrial cell through an inter-base-station interface.

In one embodiment, the step that part or all of the content of the random access related message is exchanged with the terrestrial cell through the inter-base-station interface includes: the base station to which the satellite cell belongs generates a complete random access related message, and the generated random access related message is transmitted to the terrestrial cell through the inter-base-station interface; or the base station to which the satellite cell belongs transmits all or part of the content of the random access related message to the terrestrial cell, and a base station to which the terrestrial cell belongs generates a complete random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the step that a cell type corresponding to the random access related message is indicated as the satellite cell includes: the cell type corresponding to the random access related message is indicated as the satellite cell through indication information added to the random access related message; or the cell type corresponding to the random access related message is indicated as the satellite cell through a radio network temporary identity (RNTI) scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the method further includes the following. A first contention resolution timer for contention resolution of contention-based random access of the satellite cell is configured for the UE, and a time length of the first contention resolution timer is the same as or different from a time length of a second contention resolution timer for contention resolution of contention-based random access of the terrestrial cell; and/or a starting time of a first contention resolution timer for contention resolution of contention-based random access of the satellite cell is configured for the UE, and the starting time of the first contention resolution timer is different from a starting time of a second contention resolution timer for contention resolution of contention-based random access of the terrestrial cell.

In one embodiment, the method further includes the following. A third message (Msg3) of the four-step contention-based random access transmitted by the UE is received, and the Msg3 carries a C-RNTI used by the UE in the satellite cell.

Figure 11:
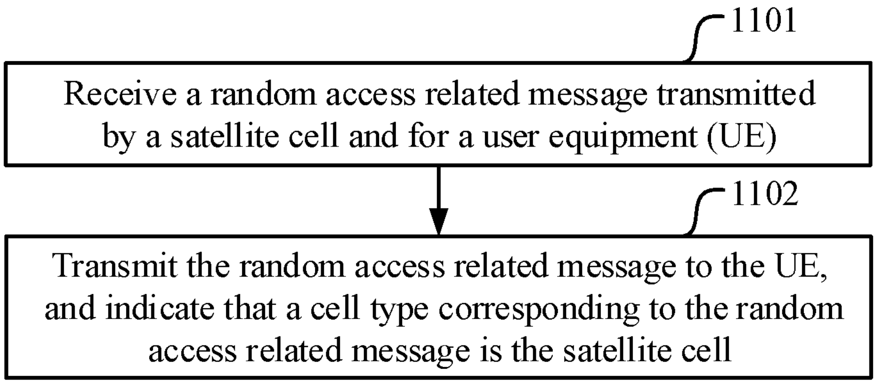
FIG. 11 is a flow chart of a random access method performed by a base station to which a terrestrial cell belongs in an embodiment of the present disclosure.

An embodiment of the present disclosure further provides a random access method performed by a base station to which a terrestrial cell belongs. As shown in FIG. 11, the method includes the following. Step 1101, a random access related message transmitted by a satellite cell and for a user equipment (UE) is received. Step 1102, the random access related message is transmitted to the UE, and a cell type corresponding to the random access related message is indicated as the satellite cell.

In one embodiment, in a condition that the terrestrial cell and the satellite cell belong to different base stations, the step that a random access related message transmitted by a satellite cell and for the UE is received includes: part or all of a content of the random access related message is exchanged with the satellite cell through an inter-base-station interface.

In one embodiment, the step that part or all of the content of the random access related message is exchanged with the satellite cell through an inter-base-station interface includes: a complete random access related message transmitted by a base station to which the satellite cell belongs is received through the inter-base-station interface; or part or all of the content of the random access related message transmitted by the satellite cell is received through the inter-base-station interface, and a complete random access related message is generated according to the part or all of the content of the random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the step that the cell type corresponding to the random access related message is indicated as the satellite cell includes: the cell type corresponding to the random access related message is indicated as the satellite cell through indication information added to the random access related message; or the cell type corresponding to the random access related message is indicated as the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the method further includes the following. A second contention resolution timer for contention resolution of contention-based random access of the terrestrial cell is configured for the UE, and a time length of the second contention resolution timer is different from a time length of a first contention resolution timer for contention resolution of contention-based random access of the satellite cell; and/or a starting time of a second contention resolution timer for contention resolution of contention-based random access of the terrestrial cell is configured for the UE, and the starting time of the second contention resolution timer having a difference from a starting time from of the a first contention resolution timer for contention resolution of contention-based random access of the satellite cell.

In one embodiment, in a condition that the random access related message includes a fourth message (Msg4) in a four-step contention-based random access process, the Msg4 includes at least one of the following: an uplink and/or downlink resource allocated to the UE by a base station to which the satellite cell belongs and used by the UE in the satellite cell; or a C-RNTI used by the UE in the satellite cell.

The random access method performed by the UE provided in the embodiment of the present disclosure and the UE in Embodiment 1 of the present disclosure belong to the embodiments, and various implementations applied to the random access of the UE in the system provided in the embodiment described above may be applied to the random access method performed by the UE in the present embodiment, which will not be described in detail.

The random access method performed by the base station to which the satellite cell belongs provided in the embodiment of the present disclosure and the base station to which the satellite cell belongs in Embodiment 1 of the present disclosure belong to the embodiments, and various implementations applied to the random access of the base station to which the satellite cell belongs in the system provided in the embodiment described above may be applied to the random access method performed by the base station to which the satellite cell belongs in the present embodiment, which will not be described in detail.

The random access method performed by the base station to which the terrestrial cell belongs provided in the embodiment of the present disclosure and the base station to which the terrestrial cell belongs in Embodiment 1 of the present disclosure belong to the embodiments, and various implementations applied to the random access of the base station to which the terrestrial cell belongs in the system provided in the embodiment described above may be applied to the random access method performed by the base station to which the terrestrial cell belongs in the present embodiment, which will not be described in detail.

Embodiment 3

Figure 12:
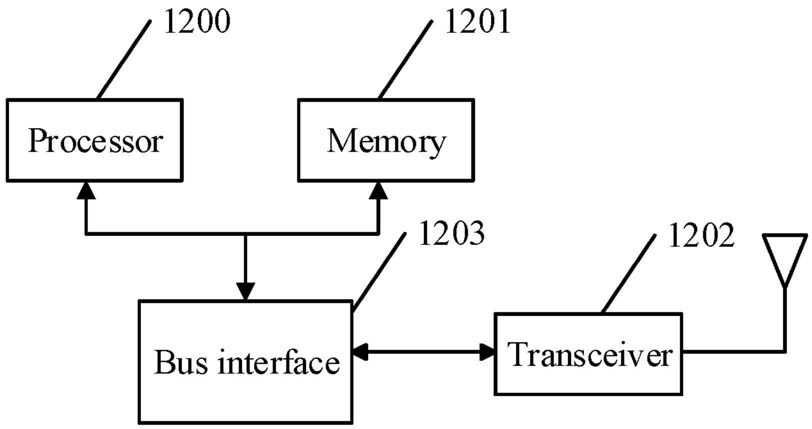
FIG. 12 is a structural schematic diagram of a random access device applied to a terminal side in an embodiment of the present disclosure.

The present disclosure provides a random access device applied to a user equipment side. As shown in FIG. 12, the random access device includes: a processor 1200, a memory 1201, a transceiver 1202, and a bus interface 1203.

The processor 1200 is configured for managing a bus architecture and general processing. The memory 1201 may store data used by the processor 1200 during operations. The transceiver 1202 is configured for receiving and transmitting data under the control of the processor 1200.

The bus architecture may include any number of interconnected buses and bridges, which are specifically linked together through various circuits of one or more processors represented by the processor 1200, and a memory represented by the memory 1201. The bus architecture may also link together various other circuits of peripheral apparatuses, voltage regulators, power management circuits, etc. which are well known in the art, and thus will not be further described herein. A bus interface provides an interface. The processor 1200 is configured for managing the bus architecture and general processing. The memory 1201 may store data used by the processor 1200 during operations.

Procedures disclosed in the embodiments of the present disclosure may be applied to the processor 1200, or implemented by the processor 1200. During implementation, all steps of a signal processing procedure may be implemented through an integrated logic circuit of hardware in the processor 1200, or through instructions in the form of software. The processor 1200 may be a programmable logic device, such as a general-purpose processor, a digital signal processor, an application specific integrated circuit, or a field programmable gate array, a discrete gate or transistor logic device, or a discrete hardware assembly, and may implement or execute all the methods, steps, and logic blocks in the embodiments of the present disclosure. The general-purpose processor may be a microprocessor, any conventional processor, etc. The steps of the methods disclosed in combination with the embodiments of the present disclosure may be executed directly through a hardware processor, or executed by combining hardware and software modules in a processor with each other. The software module may be located in a storage medium mature in the art, such as a random access memory, a flash memory, a read-only memory, a programmable read-only memory, or an electrically erasable programmable memory, and a register. The storage medium is located in the memory 1201. The processor 1200 reads information from the memory 1201, and executes the steps of the signal processing procedure in combination with hardware of the processor.

In one embodiment, the processor 1200 is configured for reading a program from the memory 1201, receiving a random access related message transmitted by a terrestrial cell through a transceiver, and determining a cell type corresponding to the random access related message, and the cell type is the terrestrial cell or a satellite cell.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, determining, by the processor, a cell type corresponding to the random access related message includes: the cell type corresponding to the random access related message is determined through indication information added to the random access related message; or the cell type corresponding to the random access related message is determined through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the processor is further configured for: receiving a first contention resolution timer used for contention resolution of contention-based random access of the satellite cell and a second contention resolution timer used for contention resolution of contention-based random access of the terrestrial cell, which are both configured by a network apparatus, through the transceiver, and a time length of the first contention resolution timer is the same as or different from a time length of the second contention resolution timer, and/or a starting time of the first contention resolution timer is different from a starting time of the second contention resolution timer.

In one embodiment, the processor is further configured for: transmitting a third message (Msg3) of the four-step contention-based random access to the satellite cell through the transceiver, and the Msg3 carries a C-RNTI used by the UE in the satellite cell.

In one embodiment, the processor is further configured for: determining that the contention resolution succeeds when the random access related message includes at least one of the following: an uplink and/or downlink resource allocated to the UE by a base station to which the satellite cell belongs and used by the UE in the satellite cell; or a C-RNTI used by the UE in the satellite cell.

Figure 13:
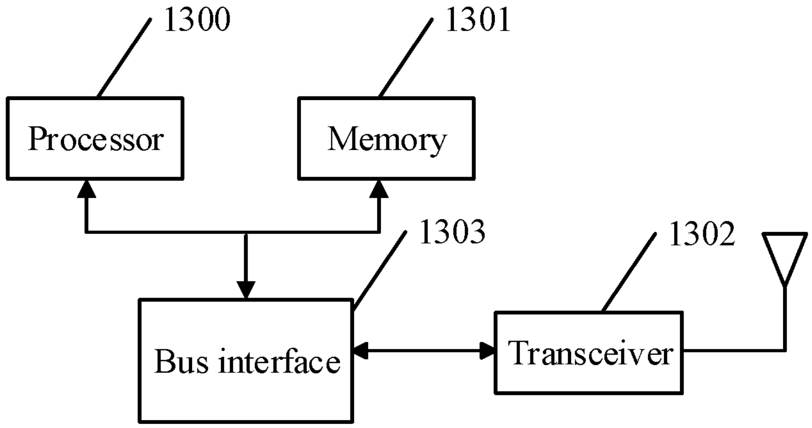
FIG. 13 is a structural schematic diagram of a random access device applied to a satellite cell in an embodiment of the present disclosure.

An embodiment of the present disclosure further provides a random access device applied to a satellite cell. As shown in FIG. 13, the device includes: a processor 1300, a memory 1301, a transceiver 1302, and a bus interface 1303.

The processor 1300 is configured for managing a bus architecture and general processing. The memory 1301 may store data used by the processor 1300 during operations. The transceiver 1302 is configured for receiving and transmitting data under the control of the processor 1300.

The bus architecture may include any number of interconnected buses and bridges, which are specifically linked together through various circuits of one or more processors represented by the processor 1300, and a memory represented by the memory 1301. The bus architecture may also link together various other circuits of peripheral apparatuses, voltage regulators, power management circuits, etc. which are well known in the art, and thus will not be further described herein. A bus interface provides an interface. The processor 1300 is configured for managing the bus architecture and general processing. The memory 1301 may store data used by the processor 1300 during operations.

Procedures disclosed in the embodiment of the present disclosure may be applied to the processor 1300, or implemented by the processor 1300. During implementation, all steps of a signal processing procedure may be implemented through an integrated logic circuit of hardware in the processor 1300, or through instructions in the form of software. The processor 1300 may be a programmable logic device, such as a general-purpose processor, a digital signal processor, an application specific integrated circuit, or a field programmable gate array, a discrete gate or transistor logic device, or a discrete hardware assembly, and may implement or execute all the methods, steps, and logic blocks in the embodiments of the present disclosure. The general-purpose processor may be a microprocessor, any conventional processor, etc. The steps of the methods disclosed in combination with the embodiments of the present disclosure may be executed directly through a hardware processor, or executed by combining hardware and software modules in a processor with each other. The software module may be located in a storage medium mature in the art, such as a random access memory, a flash memory, a read-only memory, a programmable read-only memory, or an electrically erasable programmable memory, and a register. The storage medium is located in the memory 1301. The processor 1300 reads information from the memory 1301, and executes the steps of the signal processing procedure in combination with hardware of the processor.

In one embodiment, the processor 1300 is configured for reading a program from the memory 1301, determining a terrestrial cell accessed by a UE, and transmitting a random access related message to the UE through the terrestrial cell, and indicating that a cell type corresponding to the random access related message is the satellite cell.

In one embodiment, if the terrestrial cell and the satellite cell belong to different base stations, transmitting, by the processor, a random access related message to the UE through the terrestrial cell, and indicating that the cell type corresponding to the random access related message is the satellite cell includes: part or all of a content of the random access related message is exchanged with the terrestrial cell through an inter-base-station interface.

In one embodiment, the step that part or all of the content of the random access related message is exchanged by the processor with the terrestrial cell through the inter-base-station interface includes: a complete random access related message is generated, and the generated random access related message is transmitted to the terrestrial cell by the transceiver through the inter-base-station interface; or all or part of the content of the random access related message is transmitted to the terrestrial cell by the transceiver, and a base station to which the terrestrial cell belongs generates a complete random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the processor indicating that the cell type corresponding to the random access related message is the satellite cell includes: the cell type corresponding to the random access related message is indicated as the satellite cell through indication information added to the random access related message; or the cell type corresponding to the random access related message is indicated as the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the processor is further configured for: configuring, for the UE, a first contention resolution timer for contention resolution of contention-based random access of the satellite cell, and a time length of the first contention resolution timer is the same as or different from a time length of a second contention resolution timer for contention resolution of contention-based random access of the terrestrial cell; and/or configuring, for the UE, a starting time of a first contention resolution timer for contention resolution of contention-based random access of the satellite cell, and the starting time of the first contention resolution timer is different from a starting time of a second contention resolution timer for contention resolution of contention-based random access of the terrestrial cell.

In one embodiment, the processor is further configured for: receiving a third message (Msg3) of the four-step contention-based random access transmitted by the UE through the transceiver, and the Msg3 carries a C-RNTI used by the UE in the satellite cell.

Figure 14:
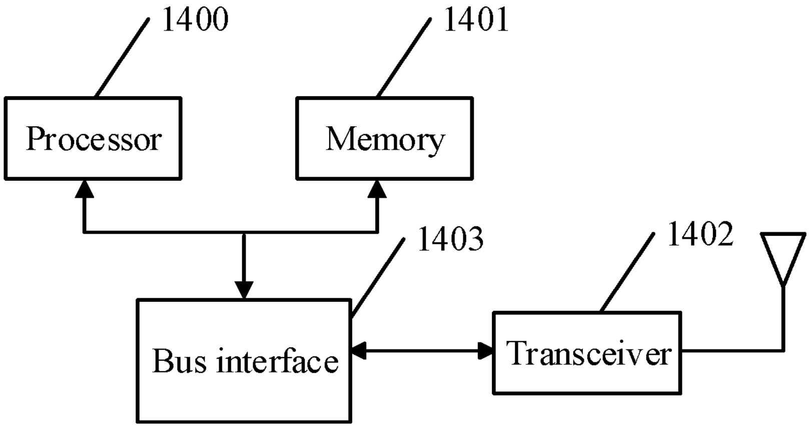
FIG. 14 is a structural schematic diagram of a random access device applied to a terrestrial cell in an embodiment of the present disclosure.

An embodiment of the present disclosure further provides a random access device applied to a terrestrial cell. As shown in FIG. 14, the device includes: a processor 1400, a memory 1401, a transceiver 1402, and a bus interface 1403.

The processor 1400 is configured for managing a bus architecture and general processing. The memory 1401 may store data used by the processor 1400 during operations. The transceiver 1402 is configured for receiving and transmitting data under the control of the processor 1400.

The bus architecture may include any number of interconnected buses and bridges, which are specifically linked together through various circuits of one or more processors represented by the processor 1400, and a memory represented by the memory 1401. The bus architecture may also link together various other circuits of peripheral apparatuses, voltage regulators, power management circuits, etc. which are well known in the art, and thus will not be further described herein. A bus interface provides an interface. The processor 1400 is configured for managing the bus architecture and general processing. The memory 1401 may store data used by the processor 1400 during operations.

Procedures disclosed in the embodiments of the present disclosure may be applied to the processor 1400, or implemented by the processor 1400. During implementation, all steps of a signal processing procedure may be implemented through an integrated logic circuit of hardware in the processor 1400, or through instructions in the form of software. The processor 1400 may be a programmable logic device, such as a general-purpose processor, a digital signal processor, an application specific integrated circuit, or a field programmable gate array, a discrete gate or transistor logic device, or a discrete hardware assembly, and may implement or execute all the methods, steps, and logic blocks in the embodiments of the present disclosure. The general-purpose processor may be a microprocessor, any conventional processor, etc. The steps of the methods disclosed in combination with the embodiments of the present disclosure may be executed directly through a hardware processor, or executed by combining hardware and software modules in a processor with each other. The software module may be located in a storage medium mature in the art, such as a random access memory, a flash memory, a read-only memory, a programmable read-only memory, or an electrically erasable programmable memory, and a register. The storage medium is located in the memory 1401. The processor 1400 reads information from the memory 1401, and executes the steps of the signal processing procedure in combination with hardware of the processor.

In one embodiment, the processor 1400 is configured for reading a program from the memory 1401, receiving a random access related message transmitted by a satellite cell and for a user equipment (UE) through the transceiver, and transmitting the random access related message to the UE, and indicating that a cell type corresponding to the random access related message is the satellite cell.

In one embodiment, in a condition that the terrestrial cell and the satellite cell belong to different base stations, the receiving, by the processor, a random access related message transmitted by a satellite cell through the transceiver includes: part or all of a content of the random access related message is exchanged with a base station to which the satellite cell belongs through an inter-base-station interface.

In one embodiment, the step that part or all of a content of the random access related message is exchanged by the processor with the satellite cell through an inter-base-station interface includes: a complete random access related message transmitted by the base station to which the satellite cell belongs is received by the transceiver through the inter-base-station interface; or all or part of the content of the random access related message transmitted by the base station to which the satellite cell belongs is received by the transceiver through the inter-base-station interface, and a complete random access related message is generated according to the part or all of the content of the random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the processor indicating that the cell type corresponding to the random access related message is the satellite cell includes: the cell type corresponding to the random access related message is indicated as the satellite cell through indication information added to the random access related message; or the cell type corresponding to the random access related message is indicated as the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the processor is further configured for: configuring, for the UE, a second contention resolution timer for contention resolution of contention-based random access of the terrestrial cell, and a time length of the second contention resolution timer is different from a time length of a first contention resolution timer for contention resolution of contention-based random access of the satellite cell; and/or configuring, for the UE, a starting time of a second contention resolution timer for contention resolution of contention-based random access of the terrestrial cell, and the starting time of the second contention resolution timer is different from a starting time of a first contention resolution timer for contention resolution of contention-based random access of the satellite cell.

In one embodiment, in a condition that the random access related message includes a message (Msg4) in a four-step random access process based on CBRA, the message (Msg4) includes at least one of the following: an uplink and/or downlink resource allocated to the UE by a base station to which the satellite cell belongs and used by the UE in the satellite cell; or a C-RNTI used by the UE in the satellite cell.

The random access device applied to the satellite cell provided in the embodiment of the present disclosure and the base station to which the satellite cell belongs in Embodiment 1 of the present disclosure belong to the embodiments, and various implementations applied to the random access of the base station to which the satellite cell belongs in the system provided in the embodiment described above may be applied to the random access device applied to the satellite cell in the present embodiment, which will not be described in detail.

The random access device applied to the terrestrial cell provided in the embodiment of the present disclosure and the base station to which the terrestrial cell belongs in Embodiment 1 of the present disclosure belong to the embodiments, and various implementations applied to the random access of the base station to which the terrestrial cell belongs in the system provided in the embodiment described above may be applied to the random access device applied to the terrestrial cell in the present embodiment, which will not be described in detail.

The random access device applied to the UE side provided in the embodiment of the present disclosure and the UE in Embodiment 1 of the present disclosure belong to the embodiments, and various implementations applied to the UE provided in the embodiment described above may be applied to the random access device applied to the UE side in the present embodiment, which will not be described in detail.

Figure 15:
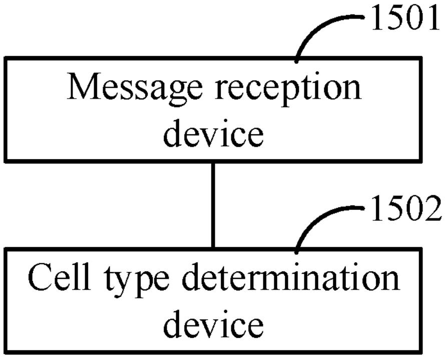
FIG. 15 is a structural schematic diagram of another random access device applied to a terminal side in an embodiment of the present disclosure.

The present disclosure provides a random access device applied to a user equipment side. As shown in FIG. 15, the device includes: a message reception device 1501, configured for receiving a random access related message transmitted by a terrestrial cell; and a cell type determination device 1502, configured for determining a cell type corresponding to the random access related message, and the cell type is the terrestrial cell or a satellite cell.

The random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the determining, by the cell type determination device, the cell type corresponding to the random access related message includes: the cell type corresponding to the random access related message is determined through indication information added to the random access related message; or the cell type corresponding to the random access related message is determined through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the device further includes: a timer configuration reception device, configured for receiving a first contention resolution timer used for contention resolution of contention-based random access of the satellite cell, and a second contention resolution timer used for contention resolution of contention-based random access of the terrestrial cell, which are both configured by a network apparatus, and a time length of the first contention resolution timer is the same as or different from a time length of the second contention resolution timer, and/or a starting time of the first contention resolution timer is different from a starting time of the second contention resolution timer.

In one embodiment, the device further includes: a message transmission device, configured for transmitting a third message (Msg3) of the four-step contention-based random access to the satellite cell, and the Msg3 carries a C-RNTI used by the UE in the satellite cell.

In one embodiment, the device further includes: a contention resolution device, configured for determining that the contention resolution succeeds when the random access related message includes at least one of the following: an uplink and/or downlink resource allocated to the UE by a base station to which the satellite cell belongs and used by the UE in the satellite cell; or a C-RNTI used by the UE in the satellite cell.

Figure 16:
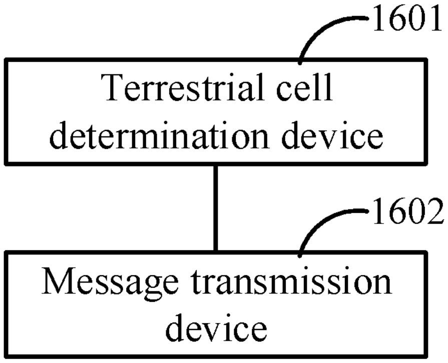
FIG. 16 is a structural schematic diagram of another random access device applied to a satellite cell in an embodiment of the present disclosure.

The present disclosure provides a random access device applied to a satellite cell. As shown in FIG. 16, the device includes: a terrestrial cell determination device 1601, configured for determining a terrestrial cell accessed by a UE; and a message transmission device 1602, configured for transmitting a random access related message to the UE through the terrestrial cell, and indicating that a cell type corresponding to the random access related message is the satellite cell.

If the terrestrial cell and the satellite cell belong to different base stations, the transmitting, by the message transmission device, the random access related message to the UE through the terrestrial cell, and indicating that the cell type corresponding to the random access related message is the satellite cell includes: part or all of a content of the random access related message is exchanged with the terrestrial cell through an inter-base-station interface.

In one embodiment, the step that part or all of a content of the random access related message is exchanged by the message transmission device with the terrestrial cell through an inter-base-station interface includes: a base station to which the satellite cell belongs generates a complete random access related message, and transmits the generated random access related message to the terrestrial cell through the inter-base-station interface; or a base station to which the satellite cell belongs transmits all or part of the content of the random access related message to the terrestrial cell, and a base station to which the terrestrial cell belongs generates a complete random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the indicating, by the message transmission device, that the cell type corresponding to the random access related message is the satellite cell includes: the cell type corresponding to the random access related message is indicated as the satellite cell through indication information added to the random access related message; or the cell type corresponding to the random access related message is indicated as the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the device further includes: a timer configuration device, configured for configuring, for the UE, a first contention resolution timer for contention resolution of contention-based random access of the satellite cell, and a time length of the first contention resolution timer is the same as or different from a time length of a second contention resolution timer for contention resolution of contention-based random access of the terrestrial cell; and/or configuring, for the UE, a starting time of a first contention resolution timer for contention resolution of contention-based random access of the satellite cell, and the starting time of the first contention resolution timer is different from a starting time of a second contention resolution timer for contention resolution of contention-based random access of the terrestrial cell.

In one embodiment, the message reception device is further configured for receiving a third message (Msg3) of the four-step contention-based random access transmitted by the UE, and the Msg3 carries a C-RNTI used by the UE in the satellite cell.

Figure 17:
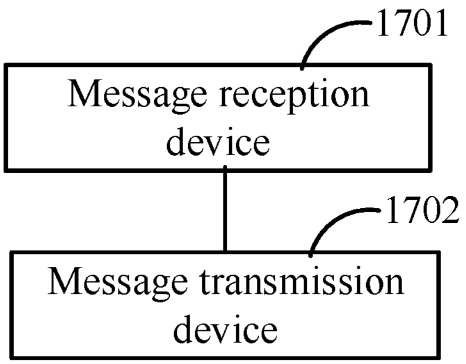
FIG. 17 is a structural schematic diagram of another random access device applied to a terrestrial cell in an embodiment of the present disclosure.

The present disclosure provides a random access device applied to a terrestrial cell. As shown in FIG. 17, the device includes: a message reception device 1701, configured for receiving a random access related message transmitted by a satellite cell and for a user equipment (UE); and a message transmission device 1702, configured for transmitting the random access related message to the UE, and indicating that a cell type corresponding to the random access related message is the satellite cell.

In a condition that the terrestrial cell and the satellite cell belong to different base stations, and the receiving, by the message transmission device, the a random access related message transmitted by a satellite cell and for the UE includes: part or all of a content of the random access related message is exchanged with the satellite cell through an inter-base-station interface.

In one embodiment, the step that part or all of a content of the random access related message is exchanged by the message reception device with the satellite cell through an inter-base-station interface includes: a complete random access related message transmitted by a base station to which the satellite cell belongs is received through the inter-base-station interface; or part or all of the content of the random access related message transmitted by the satellite cell is received through the inter-base-station interface, and a complete random access related message is generated according to the part or all of the content of the random access related message.

In one embodiment, the random access related message includes: a second message (Msg2) and/or a fourth message (Msg4) of four-step contention-based random access; or a second message (MsgB) of two-step contention-based random access; or a first message (Msg0) and a third message (Msg2) of four-step contention-free random access.

In one embodiment, the indicating, by the message transmission device, that the cell type corresponding to the random access related message is the satellite cell includes: the cell type corresponding to the random access related message is indicated as the satellite cell through indication information added to the random access related message; or the cell type corresponding to the random access related message is indicated as the satellite cell through an RNTI scrambled in the random access related message.

In one embodiment, the indication information added to the random access related message includes: indication information added to a media access control (MAC) subheader or a payload portion in a random access response media access control protocol data unit (RAR MAC PDU) corresponding to the second message (Msg2) of the four-step contention-based random access, and/or indication information added to the fourth message (Msg4) of the four-step contention-based random access; or indication information added to an MAC subheader or a payload portion in an RAR MAC PDU corresponding to the second message (MsgB) of the two-step contention-based random access; or indication information added to the first message (Msg0) of the four-step contention-free random access, and/or indication information added to an MAC subheader or a payload portion in an RAR MAC PDU corresponding to the third message (Msg2) of the four-step contention-free random access.

In one embodiment, the indication information includes any one or any combination of the following: a cell group identity to which the random access related message corresponds; a time advance group (TAG) identity to which the random access related message corresponds; a cell identity and/or a frequency point identity to which the random access related message corresponds; a cell type identity to which the random access related message corresponds; an RNTI used when the random access related message is transmitted; or cell indication information corresponding to an uplink and/or downlink resource allocated by a random access response message.

In one embodiment, the device further includes: a timer configuration device, configured for configuring, for the UE, a second contention resolution timer for contention resolution of contention-based random access of the terrestrial cell, and a time length of the second contention resolution timer is different from a time length of a first contention resolution timer for contention resolution of contention-based random access of the satellite cell; and/or configuring, for the UE, a starting time of a second contention resolution timer for contention resolution of contention-based random access of the terrestrial cell, and the starting time of the second contention resolution timer is different from a starting time of a first contention resolution timer for contention resolution of contention-based random access of the satellite cell.

In one embodiment, in a condition that the random access related message includes a fourth message (Msg4) in a four-step contention-based random access process, the Msg4 includes at least one of the following: an uplink and/or downlink resource allocated to the UE by a base station to which the satellite cell belongs and used by the UE in the satellite cell; or a C-RNTI used by the UE in the satellite cell.

The random access device applied to the satellite cell provided in the embodiment of the present disclosure and the base station to which the satellite cell belongs in Embodiment 1 of the present disclosure belong to the embodiments, and various implementations applied to the random access of the base station to which the satellite cell belongs in the system provided in the embodiment described above may be applied to the random access device applied to the satellite cell in the present embodiment, which will not be described in detail.

The random access device applied to the terrestrial cell provided in the embodiment of the present disclosure and the base station to which the terrestrial cell belongs in Embodiment 1 described above of the present disclosure belong to the embodiments, and various implementations applied to the random access of the base station to which the terrestrial cell belongs in the system provided in the embodiment described above may be applied to the random access device applied to the terrestrial cell in the present embodiment, which will not be described in detail.

The random access device applied to the UE side provided in the embodiment of the present disclosure and the UE in Embodiment 1 described above of the present disclosure belong to the embodiments, and various implementations applied to the UE in the system provided in the embodiment described above may be applied to the random access device applied to the UE side in the present embodiment, which will not be described in detail.

An embodiment of the present disclosure further provides a computer program medium, storing a computer program, the computer program implementing steps of the random access method performed by a base station to which a satellite cell belongs provided in Embodiment 2 described above when executed by a processor.

The present disclosure further provides a computer program medium, storing a computer program, the computer program implementing steps of the random access method performed by a base station to which the terrestrial cell belongs provided in Embodiment 2 described above when executed by a processor.

An embodiment of the present disclosure further provides a computer program medium, storing a computer program, the computer program implementing steps of the random access method performed by UE provided in Embodiment 2 described above when executed by a processor.

In some embodiments provided in the present disclosure, it should be understood that the disclosed system, device, and method may be implemented in other ways. For example, the device embodiments described above are merely schematic. For example, division of the modules is merely division of logic functions. Other division methods may be employed during actual implementation. For example, modules or assemblies may be combined or integrated into another system, or some features may be omitted or may not be executed. In addition, coupling, direct coupling, or communication connection with respect to each other shown or discussed may be indirect coupling or communication connection through some interfaces, devices, or modules, which may be electrical, mechanical, etc.

The module illustrated as a separate component may be physically separated or not. The component shown as a module may be a physical module or not. That is, they may be located in one place, or distributed over network modules. Part or all of the modules may be selected according to actual needs, to implement the solution to the embodiment.

In addition, all functional modules in each embodiment of the present disclosure may be integrated into one processing module. Each module may also be physically-present individually. Two or more modules may also be integrated into one module. The integrated modules described above may be implemented in the form of hardware, or in the form of software functional modules. If the integrated modules are implemented in the form of software functional modules, and sold or used as independent products, they may be stored in one computer-readable storage medium.

In the embodiments described above, all or part of the modules may be implemented through software, hardware, firmware, or any combination thereof. When implemented through the software, all or part of the modules may be implemented in the form of computer program products.

The computer program product includes one or more computer instructions. When loaded and executed on a computer, the computer program instructions produce all or part of the procedures or functions in accordance with the embodiments of the present disclosure. The computer may be a general-purpose computer, a special-purpose computer, a computer network, or another programmable device. The computer instructions may be stored in a computer-readable storage medium, or transmitted from one computer-readable storage medium to another, for example, from one website, computer, server, or data center to another website, computer, server, or data center in a wired manner (for example, through a coaxial cable, an optical fiber, and a digital subscribe line (DSL)), or a radio manner (for example, in an infrared, radio, microwave, etc. manner). The computer-readable storage medium may be any available medium that a computer may store, or an integrated server, data center, etc. including one or more available media. The available medium may be a magnetic medium (for example, a floppy disk, a hard disk, or a tape), an optical medium (for example, a digital video disk (DVD)), a semiconductor medium (for example, a solid state disk (SSD)), etc.

The embodiments of the present disclosure are described in detail above, the principles and implementations of the present disclosure are described by applying specific examples in the present disclosure, and the description of the above embodiments is merely used for assisting in understanding the method and the embodiments of the present disclosure. In one embodiment, based on the concept of the present disclosure, will make amendments to the specific implementations and the application scope. In conclusion, the content of the description should not be interpreted as limiting the present disclosure.

The embodiments of the present disclosure may be provided as methods, systems, or computer program products. Therefore, the present disclosure may employ full hardware embodiments, full software embodiments, or software and hardware combined embodiments. In one embodiment, the present d may take the form of a computer program product that is implemented on one or more computer available storage media (including, but not limited to, a disk memory, a compact disk read-only memory (CD-ROM), an optical memory, etc.) that include computer available program codes.

The present disclosure is described with reference to flow charts and/or block diagrams of the methods, apparatuses (systems), and computer program products according to the present disclosure. It should be understood that each flow and/or block in the flow charts and/or block diagrams and combinations of the flows and/or blocks in the flow charts and/or block diagrams may be implemented through the computer program instructions. These computer program instructions may be provided for a general-purpose computer, a special-purpose computer, an embedded processor, or a processor of another programmable data processing apparatus, to generate a machine. Therefore, the instructions executed by the computer or the processor of another programmable data processing apparatus generate a device for implementing a specified function in one or more flows in the flow charts and/or in one or more blocks in the block diagrams.

These computer program instructions may also be stored in a computer-readable memory that may guide the computer or another programmable data processing apparatuses to work in a specific manner. Therefore, the instructions stored in the computer-readable memory produce a product including an instruction device. The instruction device implements a specified function in one or more flows in the flow charts and/or one or more blocks in the block diagrams.

These computer program instructions may also be loaded onto the computer or another programmable data processing apparatus, and a series of operations and steps are executed on the computer or another programmable apparatus, to generate computer-implemented processing. Therefore, the instructions executed on the computer or another programmable apparatus provide steps for implementing a specified function in one or more flows in the flow charts and/or in one or more blocks in the block diagrams.

What is claimed is:

1. A random access method, performed by a user equipment (UE) and comprising:

receiving a random access related message transmitted by a terrestrial cell accessed by the UE, wherein the terrestrial cell acquires the random access related message from a satellite cell accessed by the UE; and determining a cell type corresponding to the random access related message, wherein the cell type is the satellite cell;

wherein the determining the cell type corresponding to the random access related message comprises:

determining the cell type corresponding to the random access related message through indication information contained in the random access related message;

wherein the indication information comprises at least one of the following:

a cell group identity to which the random access related message corresponds;

a time advance group (TAG) identity to which the random access related message corresponds;

a cell identity and/or a frequency point identity to which the random access related message corresponds;

a cell type identity to which the random access related message corresponds;

a radio network temporary identity (RNTI) used when the random access related message is transmitted; or cell indication information corresponding to an uplink and/or downlink resource allocated by a random access response message.

2. The method according to claim 1, wherein the random access related message comprises:

a Msg2 and/or a Msg4 of four-step contention-based random access; or a MsgB of two-step contention-based random access; or a Msg0 and a Msg2 of four-step contention-free random access.

3. The method according to claim 1, wherein the indication information contained in the random access related message comprises:

indication information contained in a media access control (MAC) subheader or a payload portion in a random access response media access control protocol data unit (RAR MAC PDU) corresponding to a Msg2 of four-step contention-based random access, and/or indication information contained in a Msg4 of the four-step contention-based random access; or indication information contained in an MAC subheader or a payload portion in an RAR MAC PDU corresponding to a MsgB of two-step contention-based random access; or indication information contained in a Msg0 of four-step contention-free random access, and/or indication information contained in an MAC subheader or a payload portion in an RAR MAC PDU corresponding to a Msg2 of the four-step contention-free random access.

4. The method according to claim 1, further comprising:

receiving a first contention resolution timer used for contention resolution of contention-based random access of the satellite cell and a second contention resolution timer used for contention resolution of contention-based random access of the terrestrial cell, which are both configured by a network apparatus, wherein a time length of the first contention resolution timer is the same as or different from a time length of the second contention resolution timer, and/or a starting time of the first contention resolution timer is different from a starting time of the second contention resolution timer.

5. The method according to claim 1, further comprising:

transmitting a Msg3 of four-step contention-based random access to the satellite cell, wherein the Msg3 carries a cell-radio network temporary identity (C-RNTI) used by the UE in the satellite cell; and/or determining that a contention resolution succeeds when the random access related message comprises at least one of the following: an uplink and/or downlink resource allocated to the UE by a base station to which the satellite cell belongs and used by the UE in the satellite cell; or a C-RNTI used by the UE in the satellite cell.

6. A random access method, performed by a base station to which a satellite cell belongs and comprising:

determining a terrestrial cell accessed by a user equipment (UE); and transmitting a random access related message to the UE through the terrestrial cell, and indicating that a cell type corresponding to the random access related message is the satellite cell;

wherein the indicating that the cell type corresponding to the random access related message is the satellite cell comprises:

indicating that the cell type corresponding to the random access related message is the satellite cell through indication information contained in the random access related message;

wherein the indication information comprises at least one of the following:

a cell group identity to which the random access related message corresponds;

a time advance group (TAG) identity to which the random access related message corresponds;

a cell identity and/or a frequency point identity to which the random access related message corresponds;

a cell type identity to which the random access related message corresponds;

a radio network temporary identity (RNTI) used when the random access related message is transmitted; or cell indication information corresponding to an uplink and/or downlink resource allocated by a random access response message.

7. The method according to claim 6, wherein in a condition that the terrestrial cell and the satellite cell belong to different base stations, the transmitting the random access related message to the UE through the terrestrial cell, and indicating that the cell type corresponding to the random access related message is the satellite cell comprise:

exchanging part or all of a content of the random access related message with the terrestrial cell through an inter-base-station interface.

8. The method according to claim 7, wherein the exchanging the part or all of the content of the random access related message with the terrestrial cell through the inter-base-station interface comprises:

generating a complete random access related message, and transmitting the generated random access related message to the terrestrial cell through the inter-base-station interface; or transmitting all or part of the content of the random access related message to the terrestrial cell, wherein a base station to which the terrestrial cell belongs generates a complete random access related message.

9. A random access method, performed by a base station to which a terrestrial cell belongs and comprising:

receiving a random access related message transmitted by a satellite cell and for a user equipment (UE); and transmitting the random access related message to the UE, and indicating that a cell type corresponding to the random access related message is the satellite cell, wherein the indicating that the cell type corresponding to the random access related message is the satellite cell comprises:

indicating that the cell type corresponding to the random access related message is the satellite cell through indication information contained in the random access related message;

wherein the indication information comprises at least one of the following:

a cell group identity to which the random access related message corresponds;

a time advance group (TAG) identity to which the random access related message corresponds;

a cell identity and/or a frequency point identity to which the random access related message corresponds;

a cell type identity to which the random access related message corresponds;

a radio network temporary identity (RNTI) used when the random access related message is transmitted; or cell indication information corresponding to an uplink and/or downlink resource allocated by a random access response message.

10. The method according to claim 9, wherein in a condition that the terrestrial cell and the satellite cell belong to different base stations, the receiving the random access related message transmitted by the satellite cell and for the UE comprises:

exchanging part or all of a content of the random access related message with the satellite cell through an inter-base-station interface.

11. A random access device, comprising a memory and a processor, wherein:

the memory is configured for storing a computer program; and the processor is configured for: reading the computer program from the memory to perform the method according to claim 1.

12. The device according to claim 11, wherein the random access related message comprises:

a Msg2 and/or a Msg4 of four-step contention-based random access; or a MsgB of two-step contention-based random access; or a Msg0 and a Msg2 of four-step contention-free random access.

13. The device according to claim 11, wherein the indication information contained in the random access related message comprises:

indication information contained in a media access control (MAC) subheader or a payload portion in a random access response media access control protocol data unit (RAR MAC PDU) corresponding to a Msg2 of four-step contention-based random access, and/or indication information contained in a Msg4 of the four-step contention-based random access; or indication information contained in an MAC subheader or a payload portion in an RAR MAC PDU corresponding to a MsgB of two-step contention-based random access; or indication information contained in a Msg0 of four-step contention-free random access, and/or indication information contained in an MAC subheader or a payload portion in an RAR MAC PDU corresponding to a Msg2 of the four-step contention-free random access.

14. A random access device, applied to a satellite cell and comprising a memory and a processor, wherein:

the memory is configured for storing a computer program; and the processor is configured for: reading the computer program from the memory to perform the method according to claim 6.

15. A random access device, applied to a terrestrial cell and comprising a memory and a processor, wherein:

the memory is configured for storing a computer program; and the processor is configured for: reading the computer program from the memory to perform the method according to claim 9.

* * * * *